United States Patent
Gao et al.

(10) Patent No.: US 11,218,997 B2
(45) Date of Patent: Jan. 4, 2022

(54) UPLINK CONTROL CHANNEL TRANSMISSION METHOD, TERMINAL, BASE STATION AND DEVICE

(71) Applicant: CHINA ACADEMY OF TELECOMMUNICATIONS TECHNOLOGY, Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 113 days.

(21) Appl. No.: 16/623,373

(22) PCT Filed: Apr. 17, 2018

(86) PCT No.: PCT/CN2018/083398
§ 371 (c)(1),
(2) Date: Dec. 16, 2019

(87) PCT Pub. No.: WO2018/228044
PCT Pub. Date: Dec. 20, 2018

(65) Prior Publication Data
US 2020/0187193 A1    Jun. 11, 2020

(30) Foreign Application Priority Data
Jun. 16, 2017   (CN) .......................... 201710457823.0

(51) Int. Cl.
*H04W 72/04* (2009.01)
(52) U.S. Cl.
CPC ... *H04W 72/0413* (2013.01); *H04W 72/0446* (2013.01)

(58) Field of Classification Search
CPC ............ H04W 72/04; H04W 72/0413; H04W 72/0446; H04L 5/0053
See application file for complete search history.

(56) References Cited

U.S. PATENT DOCUMENTS

| | | | |
|---|---|---|---|
| 2017/0164352 A1 | 6/2017 | Yang et al. | |
| 2018/0227906 A1* | 8/2018 | Yang | ..................... H04W 74/00 |

(Continued)

FOREIGN PATENT DOCUMENTS

| | | |
|---|---|---|
| CN | 106559101 A | 4/2017 |
| CN | 106559198 A | 4/2017 |
| WO | 2017098414 A1 | 6/2017 |

OTHER PUBLICATIONS

Guang Dong OPPO Mobile Telecom. Slot Aggregation and Configuration for NR Long PUCCH. 3GPP TSG RAN WG1 meeting #89, R1-1707713. May 19, 2017.

(Continued)

*Primary Examiner* — Brian D Nguyen
(74) *Attorney, Agent, or Firm* — Kilpatrick Townsend & Stockton, LLP

(57) ABSTRACT

Disclosed in the present application are an uplink control channel transmission method, a terminal, a base station and a device, for solving the problem, in the prior art, that no relevant solution addresses how to perform long NR-PUCCH transmission in multiple slots. The method applied to a terminal comprises: determining a total transmission length T of an uplink control channel (PUCCH) to be transmitted in P slots; determining the transmission structure of the PUCCH on the basis of T; and transmitting the PUCCH in the P slots according to the transmission structure. The present invention defines the transmission structure for long PUCCH transmission in multiple slots, realizing the normal transmission of the long PUCCH in multiple slots.

22 Claims, 9 Drawing Sheets

Determine a total transmission length T of an uplink control channel (PUCCH) to be transmitted in P slots  ─ 101

Determine the transmission structure of the PUCCH on the basis of T  ─ 102

Transmit the PUCCH in the P slots according to the transmission structure  ─ 103

(56) References Cited

U.S. PATENT DOCUMENTS

| | | | | |
|---|---|---|---|---|
| 2018/0278380 A1* | 9/2018 | Kim | ...................... | H04L 1/1861 |
| 2019/0239123 A1* | 8/2019 | Kim | .................. | H04W 72/0453 |
| 2019/0319766 A1* | 10/2019 | Baldemair | ........ | H04W 72/1289 |
| 2020/0044796 A1* | 2/2020 | Yang | ..................... | H04L 5/0092 |
| 2020/0187200 A1* | 6/2020 | Han | ...................... | H04L 1/1861 |
| 2020/0213055 A1* | 7/2020 | Kim | ...................... | H04L 1/0072 |
| 2021/0120510 A1* | 4/2021 | Kwak | ..................... | H04L 25/00 |

OTHER PUBLICATIONS

LG Electronics. Consideration on Long NR-PUCCH Resource. 3GPP TSG RAN WG1 Meeting #89, R1-1707645. May 19, 2017.

Huawei et al. Long Duration PUCCH Structure. 3GPP TSG RAN WG1 Meeting #89, R1-1706953. May 19, 2017.

CATT. Long Duration PUCCH Structure. 3GPP TSG RAN WG1 Meeting #89, R1-1707504. May 19, 2017.

CATT: "PUCCH resource allocation", 3GPP TSG RAN WG1 Meeting #89, R1-1707505, Hangzhou, P.R. China May 15-19, 2017.

Huawei et al. "Long duration PUCCH formats", 3GPP TSG RAN WG1 Meeting #89, Hangzhou, China, May 15-19, 2017, total 3 pages, R1-1706954.

ZTE "Long PUCCH—1 /2 bits UCI", 3GPP TSG RAN WG1 Meeting #89, Hangzhou, P. R. China, May 15-19, 2017, total 8 pages, R1-1707170.

LG Electronics "Design of long NR-PUCCH for more than 2 bits", 3GPP TSG RAN WG1 Meeting #89, Hangzhou, P.R. China May 15-19, 2017, total 4 pages, R1-1707642.

Cohere Technologies "Structure of PUCCH in long-duration", 3GPP TSG-RAN Meeting #89, Hangzhou, China, May 13-20, 2017, total 5 pages, R1-1708314.

\* cited by examiner

UPLINK CONTROL CHANNEL TRANSMISSION METHOD, TERMINAL, BASE STATION AND DEVICE

This application is a National Stage of International Application No. PCT/CN2018/083398, filed on Apr. 17, 2018, which claims priority of a Chinese patent application filed on Jun. 16, 2017 in the Chinese Patent Office, with an application number of 201710457823.0, and entitled "Uplink Control Channel Transmission Method, Terminal, Base Station and Device", the entire contents of which are incorporated herein by reference.

FIELD

The application relates to the technical field of communication, in particular to an uplink control channel transmission method, a terminal, a base station and a device.

BACKGROUND

With the development and change of mobile communication service requirements, organizations such as ITU (International Telecommunication Union) and 3GPP (3rd Generation Partnership Project) have begun to study new wireless communication systems (e.g. 5G NR, namely 5 Generation New RAT). A new frame structure is defined in a new wireless communication system, which supports different baseband parameters (numerology, including parameters such as subcarrier spacing).

For different baseband parameters, it is defined that the length of one subframe is 1 ms, and one subframe contains multiple slots; the number of slots contained in one subframe may vary with different baseband parameters, and the length of one subframe needs to be 1 ms. For different baseband parameters, a slot may contain 7 or 14 symbols (OFDM or DFT-S-OFDM and other symbols). For example, when the subcarrier spacing is 30 kHz, assuming that one slot is agreed or configured to contain 7 symbols, in order to meet the requirement that one subframe is 1 ms in length, one subframe needs to contain 4 slots, and assuming that one slot is agreed or configured to contain 14 symbols, in order to meet the requirement that one subframe is 1 ms in length, one subframe needs to contain 2 slots. A slot may have multiple slot structures, and different structures correspond to different uplink and downlink resource divisions in a slot. For example, multiple symbols in a slot may all be used for downlink transmission, i.e. DL only slot, and may all be used for uplink transmission, i.e. UL only slot, or, some symbols are used for uplink transmission and some for downlink transmission, i.e. DL+UL slot. A slot structure can be semi-statically notified to a terminal through RRC signaling, or can be dynamically notified to the terminal through multicast common signaling so that the slot structure is dynamically changed.

Since the number of uplink symbols contained in one slot may change, two types of NR-PUCCH, long NR-PUCCH and short NR-PUCCH, are defined in a 5G NR system, wherein the long NR-PUCCH may occupy 4 to 14 symbol transmissions and the short NR-PUCCH may occupy 1 or 2 symbol transmissions. In order to improve uplink coverage, the long NR-PUCCH may also be transmitted in multiple slots. At present, there is no clear plan on how to carry out long NR-PUCCH transmission in multiple slots.

SUMMARY

The embodiments of the present application provide an uplink control channel transmission method, a terminal, a base station and a device, for solving the problem, in the prior art, that no relevant solution addresses how to perform long NR-PUCCH transmission in multiple slots.

The specific technical scheme provided by the embodiments of the present application is as follows.

In a first aspect, the embodiments of the present application provide an uplink control channel transmission method which is applied to a terminal, the method including:

determining a total transmission length T of an uplink control channel (PUCCH) to be transmitted in P slots;

determining a transmission structure of the PUCCH on the basis of T; and transmitting the PUCCH in the P slots according to the transmission structure.

In a possible embodiment, the determining the total transmission length T of the PUCCH to be transmitted in P slots includes:

determining the T according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure; or, determining the T according to configuration information of higher layer signaling; or, determining the T according to a predetermined agreement.

In a possible embodiment, the determining the T according to the indication field in the PDCCH includes:

indicating by the indication field a total transmission length corresponding to transmission of the PUCCH; or, indicating by the indication field a quantity P of slots corresponding to transmission of the PUCCH, and determining the T according to the quantity P of slots.

In a possible embodiment, the determining the T according to the configuration information of the higher layer signaling includes:

indicating by the configuration information a total transmission length corresponding to transmission of the PUCCH; or, indicating by the configuration information a quantity P of slots corresponding to transmission of the PUCCH, and determining the T according to the quantity P of slots.

In a possible embodiment, the determining the T according to the number P of slots includes:

determining the T based on a size of a UL area of each of the P slots or a size of an area used for transmitting the PUCCH in the UL area of each of the P slot; or determining the T based on a corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the determining the transmission structure of the PUCCH on the basis of T includes:

judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determining the transmission structure of the PUCCH based on the judgment result.

In a possible embodiment, the determining the transmission structure of the PUCCH based on the judgment result includes:

when the T is not greater than the first predetermined value X, determining, from at least one of predefined transmission structures, a transmission structure with a symbol number corresponding to the T as the transmission structure of the PUCCH, wherein in at least one of the predefined transmission structures, different transmission structures correspond to different numbers of symbol.

In a possible embodiment, the determining the transmission structure of the PUCCH based on the judgment result includes:

when the T is greater than the first predetermined value X s, dividing the T into A parts, wherein each of the A parts corresponds to an uplink control channel, the transmission length of each uplink control channel does not exceed the X, and each uplink control channel carries the same UCI information; and taking i as 1 to A in sequence, determining the transmission length of the uplink control channel corresponding to the i-th part as $M_i$, and determining, from at least one of predefined transmission structures, a transmission structure with a number of symbol corresponding to the $M_i$ as the transmission structure of the uplink control channel corresponding to the i-th part, wherein in at least one of the predefined transmission structures, different transmission structures correspond to different numbers of symbol.

In a possible embodiment, the dividing the T into A parts includes:

determining that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X;

or determining that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determining that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or taking A as a second predetermined value, and determining the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or taking A as a second predetermined value, and determining the length of each of the A−1 parts in the A parts $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a second aspect, the embodiments of the present application provide an uplink control channel transmission method which is applied to a base station, the method including:

determining a total transmission length T of an uplink control channel (PUCCH) to be transmitted in P slots;

determining a transmission structure of the PUCCH on the basis of T; and receiving the PUCCH in the P slots according to the transmission structure.

In a possible embodiment, the determining the total transmission length T of the PUCCH to be transmitted in P slots includes:

determining the T and informing a terminal of the T through an indication field or higher layer signaling in a downlink control channel (PDCCH); or determining a quantity P of slots corresponding to transmission of the PUCCH, determining the T according to the quantity P of slots, and informing the terminal of the quantity P of slots corresponding to the PUCCH through an indication field or higher layer signaling in the PDCCH; or determining the T according to a predetermined agreement;

wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure.

In a possible embodiment, the determining the T according to the number P of slots includes:

determining the T based on a size of a UL area of each of the P slots or a size of an area used for transmitting the PUCCH in the UL area of each of the P slot; or determining the T based on a corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the determining the transmission structure of the PUCCH includes:

judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determining the transmission structure of the PUCCH based on the judgment result.

In a possible embodiment, the determining the transmission structure of the PUCCH based on the judgment result includes:

when the T is not greater than the first predetermined value X, determining, from at least one of predefined transmission structures, a transmission structure with a symbol number corresponding to the T as the transmission structure of the PUCCH, wherein in at least one of the predefined transmission structures, different transmission structures correspond to different numbers of symbol.

In a possible embodiment, the determining the transmission structure of the PUCCH based on the judgment result includes:

when the T is greater than the first predetermined value X, dividing the T into A parts, wherein each of the A parts corresponds to an uplink control channel, the transmission length of each uplink control channel does not exceed the X, and each uplink control channel carries the same UCI information; and taking i as 1 to A in sequence, determining the transmission length of the uplink control channel corresponding to the i-th part as $1\%$, and determining, from the predefined at least one transmission structure, a transmission structure with a symbol number corresponding to the $M_i$ as the transmission structure of the uplink control channel corresponding to the i-th part, wherein in at least one of the predefined transmission structures, different transmission structures correspond to different numbers of symbol.

In a possible embodiment, the dividing the T into A parts includes:

determining that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determining that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determining that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{X} \right\rceil \times (A-1);$$

or taking A as a second predetermined value, and determining the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or taking A as a second predetermined value, and determining the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a third aspect, the embodiments of the present application provide a terminal, including:

a first determining device configured to determine a total transmission length T of an uplink control channel (PUCCH) to be transmitted in P slots;

a second determining device configured to determine a transmission structure of the PUCCH on the basis of T; and a transmission device configured to transmit the PUCCH in the P slots according to the transmission structure.

In a possible embodiment, the first determining device is configured to:

determine the T according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure; or, determine the T according to configuration information of higher layer signaling; or, determine the T according to a predetermined agreement.

In a possible embodiment, the first determining device is configured to:

indicate by the indication field a total transmission length corresponding to transmission of the PUCCH; or, indicate by the indication field a quantity P of slots corresponding to transmission of the PUCCH, and determine the T according to the quantity P of slots.

In a possible embodiment, the first determining device is configured to:

indicate by the configuration information a total transmission length corresponding to transmission of the PUCCH; or, indicate by the configuration information a quantity P of slots corresponding to transmission of the PUCCH, and determining the T according to the quantity P of slots.

In a possible embodiment, the first determining device is configured to:

determine the T based on a size of a UL area of each of the P slots or a size of an area used for transmitting the PUCCH in the UL area of each of the P slot; or determine the T based on a corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the second determining device is configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the second determining device is further configured to:

when the T is not greater than the first predetermined value X, determine, from at least one of predefined transmission structures, a transmission structure with a symbol number corresponding to the T as the transmission structure of the PUCCH, wherein in at least one of the predefined transmission structures, different transmission structures correspond to different numbers of symbol.

In a possible embodiment, the second determining device is further configured to:

when the T is greater than the first predetermined value X, divide the T into A parts, wherein each of the A parts corresponds to an uplink control channel, the transmission length of each uplink control channel does not exceed the X, and each uplink control channel carries the same UCI information; and take i as 1 to A in sequence, determining the transmission length of the uplink control channel corresponding to the i-th part as 1%, and determine, from at least one of predefined transmission structures, a transmission structure with a symbol number corresponding to the $M_i$ as the transmission structure of the uplink control channel corresponding to the i-th part, wherein in at least one of the predefined transmission structures, different transmission structures correspond to different numbers of symbol.

In a possible embodiment, the second determining device is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or take A as a second predetermined value, and determine the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a fourth aspect, the embodiments of the present application provide a base station, including:

a first determining device configured to determine a total transmission length T of an uplink control channel (PUCCH) to be transmitted in P slots;

a second determining device configured to determine the transmission structure of the PUCCH on the basis of T; and a receiving device configured to receive the PUCCH in the P slots according to the transmission structure.

In a possible embodiment, the first determining device is configured to:

determine the T and inform a terminal of the T through an indication field or higher layer signaling in a downlink control channel (PDCCH); or determine a quantity P of slots corresponding to transmission of the PUCCH, determine the T according to the quantity P of slots, and inform the terminal of the quantity P of slots corresponding to the PUCCH through an indication field or higher layer signaling in the PDCCH; or determine the T according to a predetermined agreement;

wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure.

In a possible embodiment, the first determining device is further configured to:

determine the T based on a size of a UL area of each of the P slots or a size of an area used for transmitting the PUCCH in the UL area of each of the P slot; or determine the T based on a corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the second determining device is configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the second determining device is further configured to:

when the T is not greater than a first predetermined value X, determine, from at least one of predefined transmission structures, a transmission structure with a symbol number corresponding to the T as the transmission structure of the PUCCH, wherein in at least one of the predefined transmission structures, different transmission structures correspond to different numbers of symbol.

In a possible embodiment, the second determining device is further configured to:

when the T is greater than a first predetermined value X, divide the T into A parts, wherein each of the A parts corresponds to an uplink control channel, the transmission length of each uplink control channel does not exceed the X, and each uplink control channel carries the same UCI information; and taking i as 1 to A in sequence, determining the transmission length of the uplink control channel corresponding to the i-th part as $1\%$, and determine, from at least one of predefined transmission structures, a transmission structure with a symbol number corresponding to the $M_i$ as the transmission structure of the uplink control channel corresponding to the i-th part, wherein in the at least one predefined transmission structure, different transmission structures correspond to different numbers of symbol.

In a possible embodiment, the second determining device is further configured to:
determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or
determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or
determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or
take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or
take A as a second predetermined value, and determine the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a fifth aspect, the embodiments of the present application provide a device, which is applied to a terminal and includes a processor, a memory and a transceiver, wherein the transceiver receives and transmits data under the control of the processor, a preset program is stored in the memory, the processor reads the program in the memory, and the following processes are executed according to the program:
determining by the processor a total transmission length T of an uplink control channel (PUCCH) to be transmitted in P slots;
determining by the processor a transmission structure of the PUCCH on the basis of T; and
transmitting by the transceiver the PUCCH in the P slots according to the transmission structure.

In a possible embodiment, the processor is further configured to:
determine the T according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure; or,
determine the T according to configuration information of higher layer signaling; or,
determine the T according to a predetermined agreement.

In a possible embodiment, the processor is further configured to:
indicate by the indication field a total transmission length corresponding to transmission of the PUCCH; or,
indicate by the indication field a quantity P of slots corresponding to transmission of the PUCCH, and determining the T according to the quantity P of slots.

In a possible embodiment, the processor is further configured to:
indicate by the configuration information a total transmission length corresponding to transmission of the PUCCH; or,
indicate by the configuration information the quantity P of slots corresponding to transmission of the PUCCH, and determining the T according to the quantity P of slots.

In a possible embodiment, the processor is further configured to:
determine the T based on the size of a UL area of each of the P slots or the size of an area for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the processor is further configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the processor is further configured to:

when the T is not greater than the first predetermined value X, determine, from at least one of predefined transmission structures, a transmission structure with a number of symbol corresponding to the T as the transmission structure of the PUCCH, wherein in at least one of the predefined transmission structures, different transmission structures correspond to different numbers of symbol.

In a possible embodiment, the processor is further configured to:

when the T is greater than the first predetermined value X, divide the T into A parts, wherein each of the A parts corresponds to an uplink control channel, the transmission length of each uplink control channel does not exceed the X, and each uplink control channel carries the same UCI information; and take i as 1 to A in sequence, determine the transmission length of the uplink control channel corresponding to the i-th part as $M_i$, and determining, from at least one of predefined transmission structures, a transmission structure with a symbol number corresponding to the $M_i$ as the transmission structure of the uplink control channel corresponding to the i-th part, wherein in to at least one of the predefined transmission structures, different transmission structures correspond to different numbers of symbol.

In a possible embodiment, the processor is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{X} \right\rfloor \times (A-1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or take A as a second predetermined value, and determining the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a sixth aspect, the embodiments of the present application provide a device, which is applied to a base station and includes a processor, a memory and a transceiver, wherein the transceiver receives and transmits data under the control of the processor, a preset program is stored in the memory, the processor reads the program in the memory, and the following processes are executed according to the program:

determining by the processor a total transmission length T of an uplink control channel (PUCCH) to be transmitted in P slots;

determining by the processor a transmission structure of the PUCCH on the basis of T; and receiving by the transceiver the PUCCH in the P slots according to the transmission structure.

In a possible embodiment, the processor is further configured to:

determine the T and informing a terminal of the T through an indication field or higher layer signaling in a downlink control channel (PDCCH); or determine a quantity P of slots corresponding to transmission of the PUCCH, determine the T according to the number P of slots, and informing the terminal of a quantity P of slots corresponding to the PUCCH through an indication field or higher layer signaling in the PDCCH; or determine the T according to a predetermined agreement;

wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure.

In a possible embodiment, the processor is further configured to:

determine the T based on a size of a UL area of each of the P slots or a size of an area used for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the processor is further configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the processor is further configured to:

when the T is not greater than the first predetermined value X, determine, from at least one of predefined transmission structures, a transmission structure with a symbol number corresponding to the T as the transmission structure of the PUCCH, wherein in at least one of the predefined transmission structures, different transmission structures correspond to different numbers of symbol.

In a possible embodiment, the processor is further configured to:

when the T is greater than the first predetermined value X, divide the T into A parts, wherein each of the A parts corresponds to an uplink control channel, the transmission length of each uplink control channel does not exceed the X, and each uplink control channel carries a same UCI information; and taking i as 1 to A in sequence, determining the transmission length of the uplink control channel corresponding to the i-th part as $M_i$, and determining, from at least one of predefined transmission structures, a transmission structure with a number of symbol corresponding to the M as the transmission structure of the uplink control channel corresponding to the i-th part, wherein in at least one of the predefined transmission structures, different transmission structures correspond to different numbers of symbol.

In a possible embodiment, the processor is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X;

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or take A as a second predetermined value, and determine the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

In a seventh aspect, the embodiments of the present application provide a computer storage medium, and the computer storage medium stores computer-executable instructions for causing the computer to perform any one of the above methods.

Based on the above technical scheme, the embodiments of the present application provide an uplink control channel transmission method. A terminal determines a total transmission length of a PUCCH to be transmitted in multiple slots, determines a transmission structure of the PUCCH on the basis of the total transmission length, and transmits the PUCCH in the multiple slots according to the transmission structure of the PUCCH. A base station receives the PUCCH according to the transmission structure of the PUCCH in the multiple slots. Thus, the problem, in the prior art, that no relevant solution addresses how to perform long NR-PUCCH transmission in multiple slots is effectively solved, realizing the normal transmission of the long PUCCH in multiple slots.

DETAILED DESCRIPTION OF THE EMBODIMENTS

In order to make the purpose, technical scheme and advantages of the present application more clear, the present application will be described in further detail below with reference to the accompanying drawings. Obviously, the described embodiments are only some embodiments of the present application, not all embodiments. Based on the embodiments in the present application, all other embodiments obtained by those of ordinary skill in the art without creative labor are within the scope of protection in the present application.

Some terms in the present application will be explained below to facilitate understanding by those skilled in the art.

(1) A terminal may be user equipment, which is a device providing voice and/or data connectivity to a user, and may include, for example, a handheld device with a wireless connection function or a processing device connected to a wireless modem. The terminal can communicate with a core network via a Radio Access Network (RAN) and exchange voice and/or data with the RAN. The terminal may include a wireless terminal device, a mobile terminal device, a subscriber unit, a subscriber station, a mobile station, a mobile, a remote station, an access point (AP), a remote terminal, an access terminal, a user terminal, a user agent, or a user device, etc. For example, the terminal may be a mobile phone (or "cellular" phone), a computer with a mobile terminal, or a portable, pocket-sized, handheld, computer built-in type or vehicle-mounted mobile device. For example, personal communication service (PCS) phones, cordless phones, session initiation protocol (SIP) phones, wireless local loop (WLL) stations, personal digital assistant (PDA) and other devices.

(2) In the embodiments of the present application, "multiple" refers to two or more. "And/or" describes the correlation of associated objects, indicating that there can be three relationships, for example, A and/or B may indicate three cases: A alone, A and B, and B alone. In addition, the character "/", unless otherwise specified, generally indicates that the associated objects are in an "or" relationship.

Figure 1:
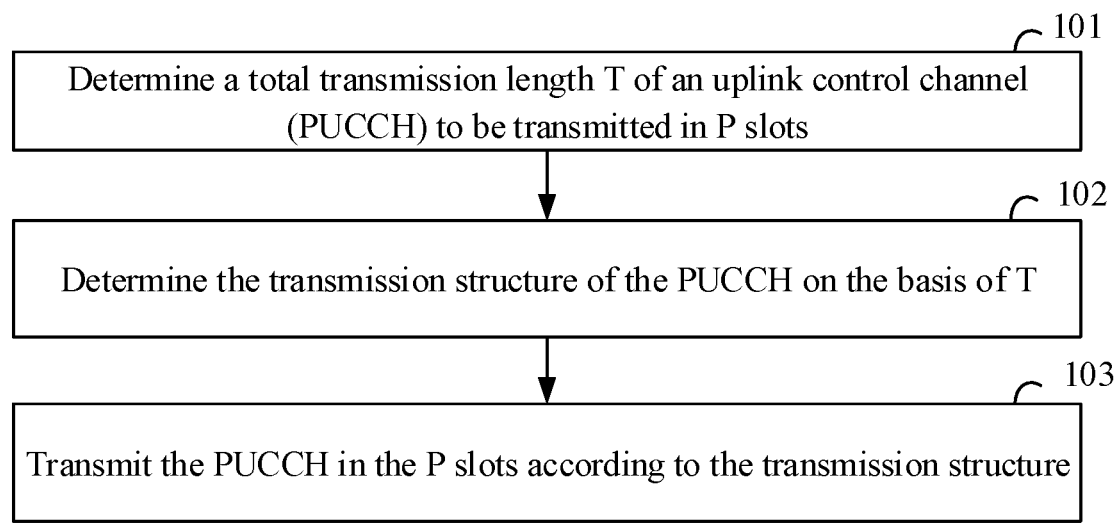
FIG. 1 is a flowchart of an uplink control channel transmission method applied to a terminal in a first embodiment of the present application.

In a first embodiment of the present application, as shown in FIG. 1, an uplink control channel transmission method applied to a terminal includes the following steps:

step 101: determining a total transmission length T of an uplink control channel (PUCCH) to be transmitted in P slots;

step 102: determining the transmission structure of the PUCCH on the basis of T; and step 103: transmitting the PUCCH in the P slots according to the transmission structure.

Particularly, in some embodiments, transmission in a 5G NR system takes slot as a unit, transmission of one PUCCH in multiple slots is supported, the PUCCH is configured to transmit in P slots, and the maximum length of the P slots does not exceed the length of one subframe. Further, the terminal can determine the total transmission length T of the PUCCH to be transmitted in the P slots, and the total transmission length is particularly expressed as the number of symbols, for example, it is agreed that the PUCCH occupies 12 symbols during transmission in the P slots, and the total transmission length T=12 at this point. Since different transmission lengths correspond to different transmission structures, the corresponding transmission structure can be determined based on the total transmission length T, so that the terminal can transmit the PUCCH in P slots based on the transmission structure.

During specific implementation, the above-mentioned step S101 can be realized by, but not limited to, the following three methods.

In a first method, the T is determined according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure.

The determination of the T according to the indication field in the PDCCH includes:

the indication field indicates a total transmission length corresponding to transmission of the PUCCH; or, the indication field indicates the number P of slots corresponding to transmission of the PUCCH, and the T is determined according to the number P of slots.

The determination of the T according to the number P of slots includes:

determining the T based on the size of a UL area of each of the P slots or the size of an area used for transmitting the PUCCH in the UL area of each of the P slot; or determining the T based on the corresponding relationship between T and different slot quantities which are predefined or preconfigured by higher layer signaling, wherein the different slot quantities which are predefined or preconfigured by higher layer signaling correspond to different total transmission lengths T.

Particularly, in some embodiments, the total transmission length T of the PUCCH to be transmitted in the multiple slots is determined according to the indication field in the PDCCH. The PDCCH includes at least one of a downlink control channel for scheduling a downlink shared channel, a downlink control channel for indicating downlink semi-persistent scheduling (SPS) resource release, and a multicast downlink control channel at least for indicating a slot structure. The total transmission length T of the PUCCH is indicated in the indication field, and at this point, the terminal can directly determine the T according to the information in the indication field. Or the number P of slots for transmitting the PUCCH is indicated in the indication field, and at this point, the terminal can determine the total transmission length T based on the value of P. The obtained values of slot quantity P or T are notified by the PDCCH, which is a dynamic notification method.

When the number P of slots is indicated, the terminal may further determine the total transmission length T according to the number of slots in the following manner:

the terminal determines a UL area or an area used for transmitting the PUCCH in the UL area according to the uplink and downlink structures of each slot in the P slots, and determines the total transmission length T according to a start and/or stop transmission symbol of the PUCCH in the UL area or the size of the PUCCH transmission area or the start and/or stop transmission of the PUCCH in the PUCCH transmission area; for example, it is agreed that in one slot, the PUCCH is always transmitted in the entire UL area in the slot, and of course the PUCCH can also be transmitted in a subset of the UL area, as long as the terminal knows in advance; and the total transmission length T can be determined according to the number P of slots and the size of the UL area or the PUCCH transmission area in the UL area in each slot;

alternatively, the total transmission lengths corresponding to different slot quantities are pre-defined in a protocol or pre-configured by higher layer signaling, and the total transmission length T corresponding to the P value is determined according to the configured slot quantity P. For example, the total transmission lengths corresponding to different slot quantities are pre-defined in the protocol or pre-configured by higher layer signaling, for example, when each slot contains 7 symbols, 2 slots correspond to T=10 (an example only, other values are not excluded), and 3 slots correspond to T=18. When each slot contains 14 symbols, 2 slots correspond to T=20, and 3 slots correspond to T=30. When P=3, if each slot contains 7 symbols, the determined total transmission length T=18. When P=2, if each slot contains 14 symbols, the determined total transmission length T=20, and further, when the terminal determines the number of slots, the corresponding total transmission length T can be determined.

In a second method, the total transmission length T is pre-configured by higher layer signaling.

Particularly, the higher layer signaling can directly configure the total transmission length T; or higher layer signaling configures the slot quantity P corresponding to the PUCCH, and the terminal determines the total transmission length T according to the slot quantity P.

The determination of the T according to the number P of slots includes:

determining the T based on the size of a UL area of each of the P slots or the size of an area used for transmitting the PUCCH in the UL area of each of the P slot; or determining the T based on the corresponding relationship between T and different slot quantities which are predefined or preconfigured by higher layer signaling, wherein the different slot quantities which are predefined or preconfigured by higher layer signaling correspond to different total transmission lengths T.

Particularly, in some embodiments, a semi-static configuration mode is adopted, a base station side can send the configuration information for determining the total transmission length T to the terminal through higher layer signaling in advance, and upon receiving the higher layer signaling, the terminal can determine the total transmission length T for transmitting the PUCCH according to the configuration information. The method can be applied to periodic UCI feedback, such as P-CSI/SR, of course, application to HARQ-ACK transmission is not excluded. For example, the higher layer signaling directly configures the total transmission length T; or the higher layer signaling configures the slot quantity P corresponding to PUCCH transmission by the terminal, and the terminal determines the total transmission length T according to the slot quantity P.

When the number P of slots is configured, the terminal can further determine the total transmission length T according to the number of slots in the following manner:

the terminal determines a UL area or an area used for transmitting the PUCCH in the UL area according to the uplink and downlink structures of each slot in the P slots, and determines the total transmission length T according to a start and/or stop transmission symbol of the PUCCH in the UL area or the size of the PUCCH transmission area or the start and/or stop transmission of the PUCCH in the PUCCH transmission area; for example, it is agreed that in one slot, the PUCCH is always transmitted in the entire UL area in the slot, and of course the PUCCH can also be transmitted in a subset of the UL area, as long as the terminal knows in advance; and the total transmission length T can be determined according to the number P of slots and the size of the UL area or the PUCCH transmission area in the UL area in each slot;

alternatively, the total transmission lengths corresponding to different slot quantities are pre-defined in a protocol or pre-configured by higher layer signaling, and the total transmission length T corresponding to the P value is determined according to the configured slot quantity P; for example, the total transmission lengths corresponding to different slot quantities are pre-defined in the protocol or pre-configured by higher layer signaling, for example, when each slot contains 7 symbols, 2 slots correspond to T=10 (an example only, other values are not excluded), and 3 slots correspond to T=18; when each slot contains 14 symbols, 2 slots correspond to T=20, and 3 slots correspond to T=30; when P=3, if each slot contains 7 symbols, the determined total transmission length T=18; when P=2, if each slot contains 14 symbols, the determined total transmission length T=20; and further, when the terminal determines the number of slots, the corresponding total transmission length T can be determined.

In a third method, the total transmission length T is predefined.

Particularly, in some embodiments, the method is applicable to periodic UCI feedback, such as P-CSI/SR. For example, the total transmission length T of the PUCCH in the P slots is agreed in advance in the protocol, and P and T can be fixed values or multiple values; if there is only one value, when the terminal turns on the multiple slots to transmit the PUCCH, the total transmission length of the PUCCH in the multiple slots is a fixed value T, and the number P of slots is also fixed, so no additional configuration is required; and if there are multiple values, P and/or T can be configured (configured by higher layer signaling or a downlink control channel), that is, similar to the first and second methods described above, the total transmission lengths corresponding to different P values can be different, and the total transmission length T is determined according to the configured P value.

Since different T values correspond to different transmission structures, the above step S102 may include the following substeps during specific implementation:

judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determining the transmission structure of the PUCCH based on the judgment result.

Particularly, in some embodiments, a first predetermined value X is preset in the terminal, and the first predetermined value X is the maximum length (e.g., the maximum number of symbols, for example, X=14) or the minimum length (e.g., the minimum number of symbols, for example, X=4) supported by the PUCCH. Alternatively, the first predetermined value X is one of a plurality of predetermined lengths supported by the PUCCH (e.g., an integer value from 4 to 14 of symbols are predetermined as the length of the PUCCH, and X is selected from 4 to 14). Further, after determining the total transmission length T during transmission in the P slots by the methods in the above-mentioned step S101, the terminal determines whether the T is greater than the first predetermined value X or not. Then the terminal determines the transmission structure of the PUCCH according to the judgment result.

Further, in some embodiments, the determination of the transmission structure of the PUCCH based on the judgment result can be divided into the following two cases.

In a first case, when the judgment result is no, determining, from the predefined at least one transmission structure, a transmission structure with a number of symbol corresponding to the T as the transmission structure of the PUCCH, wherein in the predefined at least one transmission structure, different transmission structures correspond to different numbers of symbol.

Particularly, in some embodiments, different transmission structures corresponding to different numbers of symbol are predefined in the terminal. For example, corresponding transmission structures are defined for a PUCCH with a length of 4-14 symbols respectively. For example, when the length is 4 symbols, the transmission structure is URRU or RURU; when the length is 5 symbols, the transmission structure is URRUU or RURUU; when the length is 7 symbols, the transmission structure is UURRRUU or URRUURUU; when the length is 8 symbols, the transmission structure is URRUURRU; when the length is 14 symbols, the transmission structure is UURRRUUUURRRUU (no more examples will be given); wherein U represents the symbol position where uplink control information (UCI) is transmitted, and R represents the symbol position where a pilot is transmitted. When determining that the total transmission length T of the PUCCH to be transmitted during transmission in the P slots does not exceed the first predetermined value X, the terminal determines that the transmission structure of the PUCCH is a transmission structure with symbol number corresponding to the total transmission length T in a plurality of predefined transmission structures of the PUCCH, for example, each transmission structure corresponds to one symbol length, a transmission structure with a symbol length the same as the total transmission length is selected, and the PUCCH is transmitted in the plurality of slots according to the transmission structure.

Figure 2:
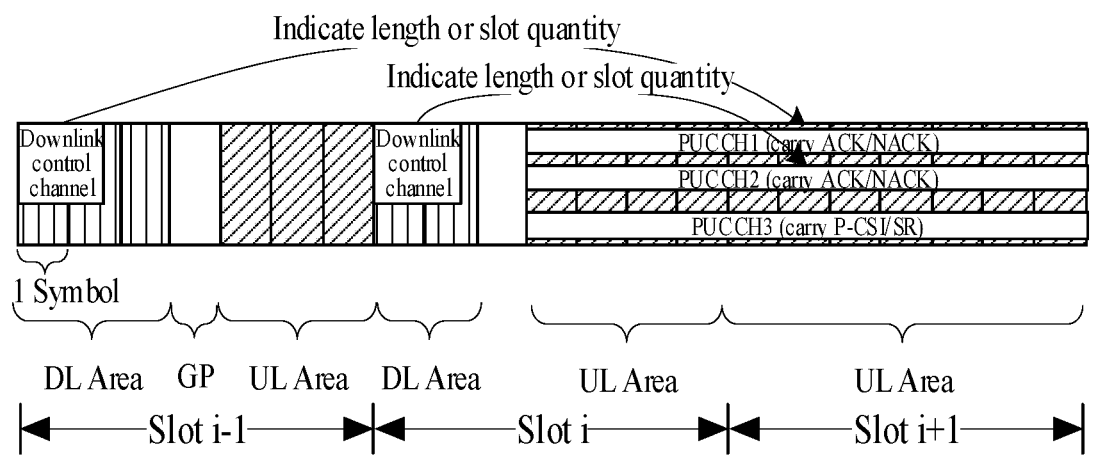
FIG. 2 is a schematic diagram of a transmission structure corresponding to a PUCCH when a total transmission length T does not exceed a first predetermined value X in the embodiments of the present application.

For example, assuming that a slot contains 7 symbols (OFDM or SC-FDMA symbols), the structure of slot i is DL for 2 symbols, GP for 1 symbol, UL for 4 symbols, and slot i+1 has a structure of full uplink, that is, all the 7 symbols are UL. Assuming that a determined HARQ feedback timing sequence is shown in FIG. 2, it may be that ACK/NACK for downlink transmission in the previous slot starts the feedback in an uplink area in the following slot, as shown in PUCCH1 in FIG. 2, or ACK/NACK for downlink transmission in the current slot starts the feedback in an uplink area in the current slot, as shown in PUCCH2 in FIG. 2. The HARQ feedback timing sequence relationship may be predefined, or may be configured by higher layer signaling or a related indication field in the downlink control channel.

Assuming the first predetermined value X=14, the terminal determines that the PUCCH which needs to be transmitted from the UL area of slot i occupies P=2 slots (for example, the 2 slots may be notified in a PDCCH corresponding to the PUCCH, or may be pre-agreed or configured). Then the terminal determines the total transmission length T of the PUCCH in the 2 slots according to the first method, the second method or the third method in step S101. For periodic UCI, such as P-CSI/SR, if slot i is determined to be the transmission slot of P-CSI/SR according to the feedback period, the terminal determines the total transmission length T of the PUCCH in the 2 slots according to the second method or the third method in step S101. Various PUCCH symbol lengths are predefined in the terminal. The structure of each symbol length corresponds to the mapping method of a corresponding pilot and data symbol. For example, the total transmission length T=11 symbols and the terminal determines T<X, therefore, the terminal determines that in the 2 slots, UCI transmission is carried by only one PUCCH, and a PUCCH with a length of 11 symbols is transmitted by using a predefined PUCCH structure with a length of 11 symbols, as shown in PUCCH3 in FIG. 2.

In a second case, when the judgment result is yes, dividing the T into A parts, wherein each of the A parts corresponds to an uplink control channel, the transmission length of each uplink control channel does not exceed the X, and each uplink control channel carries the same UCI information; and taking i as 1 to A in sequence, determining the transmission length of the uplink control channel corresponding to the i-th part as 1%, and determining, from the predefined at least one transmission structure, a transmission structure with a number of symbol corresponding to the $M_i$ as the transmission structure of the uplink control channel corresponding to the i-th part, wherein in the at least one predefined transmission structure, different transmission structures correspond to different numbers of symbol.

Particularly, in some embodiments, when it is determined that the total transmission length T of the PUCCH to be transmitted in the P slots exceeds the first predetermined value X, the terminal needs to divide the PUCCH with the total transmission length T into A parts, each of the A parts corresponds to an uplink control channel, and the transmission length (e.g., the number of symbols) of each uplink control channel does not exceed X. Different transmission structures corresponding to different numbers of symbol are predefined in the terminal, for example, the transmission structures corresponding to 4-14 symbols. If the transmission length of the uplink control channel corresponding to the i-th part in the A parts is $M_i$, then the transmission structure of the uplink control channel corresponding to the i-th part is determined to be a transmission structure with a number of symbol $M_i$. In this way, the transmission structure of the uplink control channel corresponding to each of the A parts can be determined, the corresponding uplink control channel is transmitted in the part according to the transmission structure, and one uplink control channel corresponding to each part carries the same UCI information. That is, the terminal is divided into A uplink control channels in the P slots, the A uplink control channels are transmitted according to corresponding transmission structures respectively, and each uplink control channel carries the same UCI information.

In some embodiments, the division of the T into A parts includes but not limited to the following methods:

in a first method, determining that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X.

In n a second method, determining that $$A = \left\lfloor \frac{T}{X} \right\rfloor + 1 \text{ or } \left\lceil \frac{T}{X} \right\rceil,$$

the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or the length of each of the A−1 parts in the A parts is $$\left\lceil \frac{T}{A} \right\rceil,$$

and the length of one part in the A parts is $$T - \left\lceil \frac{T}{X} \right\rceil \times (A-1).$$

In a third method, taking A as a second predetermined value, and determining the length of each of the A−1 parts in the A parts as $$\left\lfloor \frac{T}{A} \right\rfloor$$

and the length of one part in the A parts as $$T - \left\lfloor \frac{T}{A} \right\rfloor \times (A-1),$$

or determining the length of each of the A−1 parts in the A parts as $$\left\lceil \frac{T}{A} \right\rceil$$

and the length of one part in the A parts as $$T - \left\lceil \frac{T}{A} \right\rceil \times (A-1),$$

wherein the second predetermined value is agreed beforehand or determined according to the slot structure or baseband parameters or the number of slots occupied by the PUCCH.

The A−1 parts can be the first A−1 parts, or the last A−1 parts, or the predefined A−1 parts in the A parts, and the order of the A−1 parts in the A parts can be continuous or interleaved.

Particularly, the value of A can be agreed beforehand, for example, division into 2 parts is agreed; and the value of A can also be related to the slot structure or baseband parameters or the number of slots occupied by the PUCCH, for example, when a slot contains 7 symbols, it is agreed that A=2, and when a slot contains 14 symbols, it is agreed that A is the number of slots occupied by PUCCH transmission.

Assuming that a slot contains 14 symbols (OFDM or SC-FDMA symbols), the structure of slot i is DL for 3 symbols, GP for 1 symbol, UL for 10 symbols, and slot i+1 has a structure of full uplink, that is, all the 14 symbols are UL. The current slot feedback mode is taken as an example of the HARQ feedback timing sequence, and other feedback modes are not excluded. For example, ACK/NACK for downlink transmission in the previous slot in FIG. 2 starts the feedback in an uplink area in the following slot, and the transmission mode of the PUCCH is similar and will not be described again.

Figure 3:
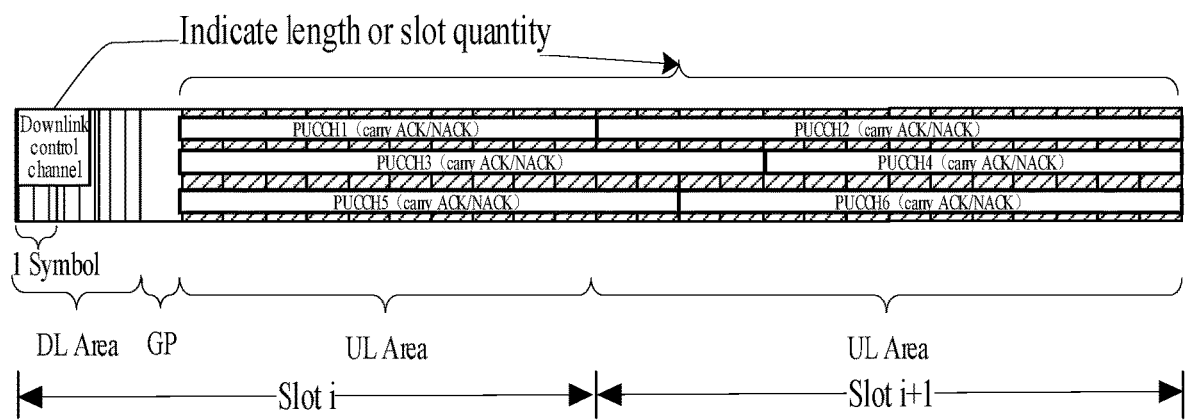
FIG. 3 is a first schematic diagram of a transmission structure corresponding to a PUCCH when a total transmission length T exceeds a first predetermined value X in the embodiments of the present application.

Assuming the first predetermined value X=14, the terminal determines that the PUCCH which needs to be transmitted from the UL area of slot i occupies P=2 slots (e.g., the 2 slots may be notified in the corresponding downlink control channel or may be pre-agreed or configured), the terminal determines the total transmission length of the PUCCH in the 2 slots according to the first method, the second method or the third method in step S101. For example, the total transmission length T=24 symbols and the terminal determines T>X, therefore, the terminal determines that in the 2 slots, the same UCI transmission is carried by A PUCCHs:

The terminal, according to the above first method, determines to divide the total transmission length T into $$A = \left\lceil \frac{T}{X} \right\rceil = 2$$

parts, for example, the length of the first part is X=T−X=10 and the length of the second part is T−(A−1)×X=14, obtains two PUCCHs with different lengths, and determines the transmission structure of each PUCCH according to the lengths, wherein the same UCI is carried in the two PUCCHs for repeated transmission of UCI, as in the case of PUCCH1 and PUCCH2 in FIG. 3. Alternatively, the length of the first part is X=14 and the length of the second part is X=T−X=10, two PUCCHs with different lengths are obtained, the transmission structure of each PUCCH is determined according to the lengths, and the same UCI is carried in the two PUCCHs for repeated transmission of UCI, as in the case of PUCCH3 and PUCCH4 in FIG. 3.

The terminal, according to the above second method, determines to divide the total transmission length T into $$A = \left\lceil \frac{T}{X} \right\rceil = 2$$

parts, or determines to divide the total transmission length T into A=2 parts according to the above third method, i.e., the second predetermined value is 2. Further, according to the second method or the third method, the length of the first part is determined to be $$\left\lfloor \frac{T}{A} \right\rfloor = 12$$

and the length of the second part is also determined to be 12, two PUCCHs with the same length are obtained, the transmission structure of each PUCCH is determined according to the length, and the same UCI is carried in the two PUCCHs for repeated transmission of UCI, as in the case of PUCCH5 and PUCCH6 in FIG. 3.

For periodic UCI, such as P-CSI/SR, if slot i is determined to be the transmission slot of P-CSI/SR according to the feedback period, the terminal determines the total transmission length of the PUCCH in the 2 slots according to the second method or the third method in step S101, for example, T=24 symbols and the terminal determines T>X, therefore, the terminal determines that the same UCI transmission is carried by a plurality of PUCCHs in a plurality of slots, and the specific PUCCH transmission mode is the same as ACK/NACK, so no more detailed description here.

In another example in some embodiments, assuming that one slot contains 7 symbols (OFDM or SC-FDMA symbols), the structure of slot i is DL for 1 symbol, GP for 1 symbol, UL for 5 symbols, and the structures of slot i+1 and slot i+2 are full uplink, that is, all the 7 symbols are UL. The current slot feedback mode is taken as an example of the HARQ feedback timing sequence, and other feedback modes are not excluded, for example, ACK/NACK for downlink transmission in the previous slot in FIG. 1 starts the feedback in an uplink area in the following slot, and the transmission mode of the PUCCH is similar and will not be described again.

Assuming the first predetermined value X=14, the terminal determines that the PUCCH which needs to be transmitted from the UL area of slot i occupies 3 slots (e.g., the 3 slots may be notified in the corresponding downlink control channel or may be pre-agreed or configured), the terminal determines the total transmission length of the PUCCH in the 3 slots according to the first method, the second method or the third method in step S101. For periodic UCI, such as P-CSI/SR, if slot i is determined to be the transmission slot of P-CSI/SR according to the feedback period, the terminal determines the total transmission length of the PUCCH in the 3 slots according to the second method or the third method in step S101. For example, the total transmission length T=19 symbols and the terminal determines T>X, therefore, the terminal determines that in the multiple slots, the same UCI transmission is carried by multiple PUCCHs.

Figure 4:
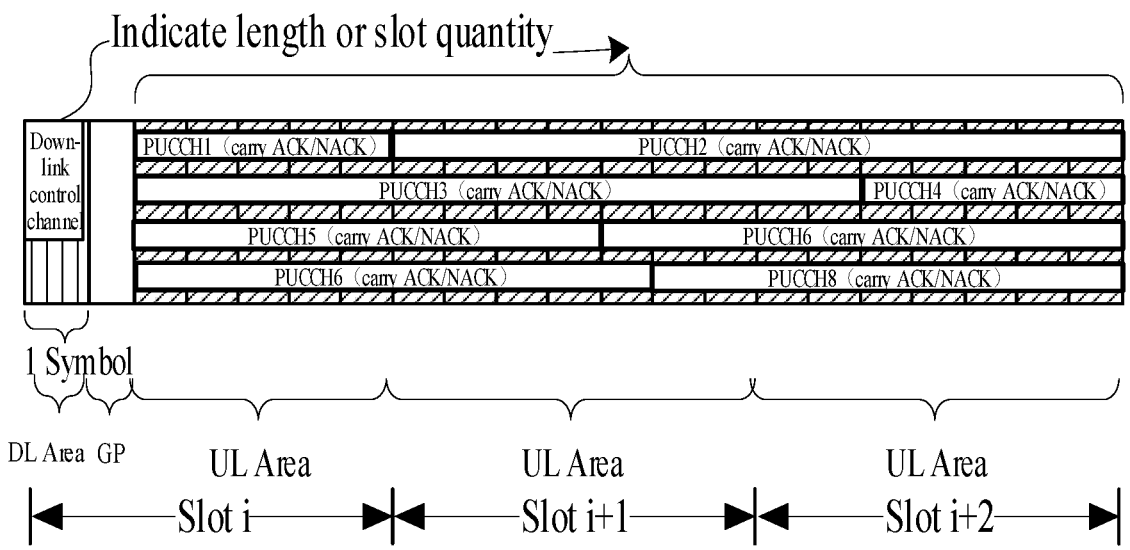
FIG. 4 is a second schematic diagram of a transmission structure corresponding to a PUCCH when a total transmission length T exceeds a first predetermined value X in the embodiments of the present application.

The terminal, according to the above first method, determines to divide the total transmission length T into $$A = \left\lceil \frac{T}{X} \right\rceil = 2$$

parts, for example, the length of the first part is X=T−X=5 and the length of the second part is X=14, obtains two PUCCHs with different lengths, and determines the transmission structure of each PUCCH according to the lengths, wherein the same UCI is carried in the two PUCCHs for repeated transmission of UCI, as in the case of PUCCH1 and PUCCH2 in FIG. 4. Alternatively, the length of the first part is X=14 and the length of the second part is X=T−X=5, two PUCCHs with different lengths are obtained, the transmission structure of each PUCCH is determined according to the lengths, and the same UCI is carried in the two PUCCHs for repeated transmission of UCI, as in the case of PUCCH3 and PUCCH4 in FIG. 4.

The terminal, according to the above second method, determines to divide the total transmission length T into $$A = \left\lceil \frac{T}{X} \right\rceil = 2$$

parts, or according to the third method, determines to divide the total transmission length T into A=2 parts, further according to the second method or the third method, determines the length of the first part as $$\left\lfloor \frac{T}{A} \right\rfloor = 9$$

and the length of the second part as 10, obtains two PUCCHs with different lengths, and determines the transmission structure of each PUCCH according to the lengths, wherein the same UCI is carried in the two PUCCHs for repeated transmission of UCI, as in the case of PUCCH5 and PUCCH6 in FIG. 4. Alternatively, the length of the first part is determined to be $$\left\lfloor \frac{T}{A} \right\rfloor = 10$$

and the length of the second part is 9, two PUCCHs with different lengths are obtained, the transmission structure of each PUCCH is determined according to the lengths, and the same UCI is carried in the two PUCCHs for repeated transmission of UCI, as in the case of PUCCH7 and PUCCH8 in FIG. 4.

For periodic UCI, such as P-CSI/SR, if slot i is determined to be the transmission slot of P-CSI/SR according to the feedback period, the terminal determines the total transmission length of the PUCCH in the 2 slots according to the second method or the third method in step S101, for example, T=19 symbols and the terminal judges T>X, therefore, the terminal determines that the same UCI transmission is carried by a plurality of PUCCHs in a plurality of slots, and the specific PUCCH transmission mode is the same as ACK/NACK, so no more detailed description here.

Figure 5:
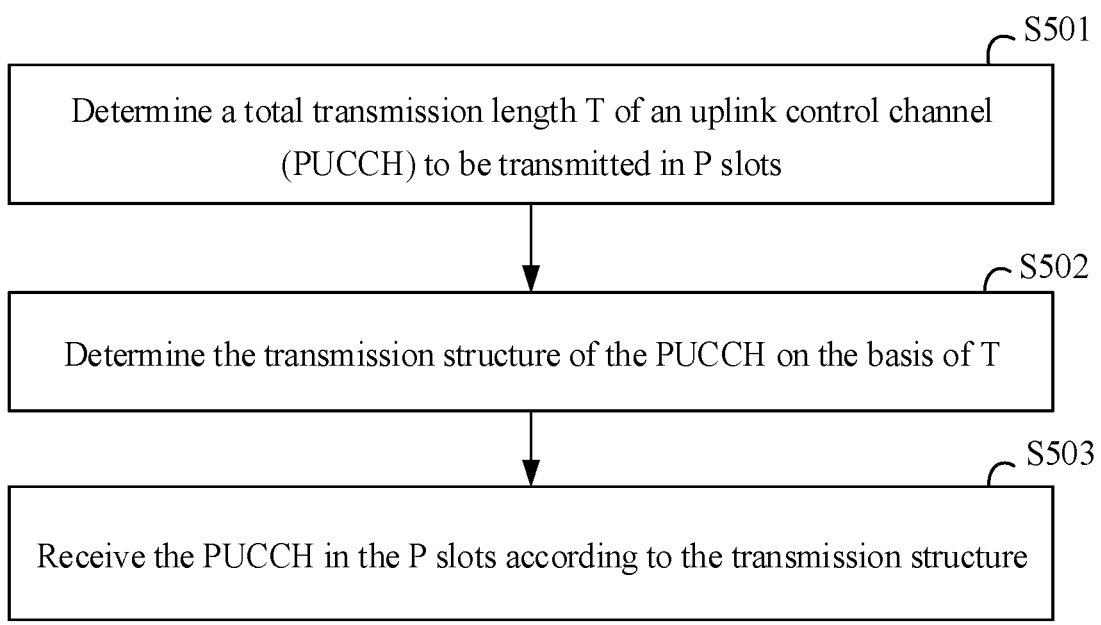
FIG. 5 is a flowchart of an uplink control channel transmission method applied to a base station in a second embodiment of the present application.

Based on the same inventive concept, the second embodiment of the present application, as shown in FIG. 5, provides an uplink control channel transmission method which is applied to a base station, the method including:

S501: determining a total transmission length T of an uplink control channel (PUCCH) to be transmitted in P slots;

S502: determining the transmission structure of the PUCCH on the basis of T; and S503: receiving the PUCCH in the P slots according to the transmission structure.

Particularly, in some embodiments, transmission in a 5G NR system takes slot as a unit, transmission of one PUCCH in multiple slots is supported, the PUCCH is configured to transmit in P slots, and the maximum length of the P slots does not exceed the length of one subframe. Further, the base station can determine the total transmission length T of the PUCCH to be transmitted in the P slots, and the total transmission length is particularly expressed as the number of symbols, for example, it is agreed that the PUCCH occupies 12 symbols during transmission in the P slots, and the total transmission length T=12 at this point. Since different transmission lengths correspond to different transmission structures, the corresponding transmission structure can be determined based on the total transmission length T, so that the base station can receive the PUCCH in P slots based on the transmission structure.

During specific implementation, the above-mentioned step S501 can be realized by, but not limited to, the following three methods.

In a first method, determining the T and informing a terminal of the T through an indication field or higher layer signaling in a downlink control channel (PDCCH); or determining the number P of slots corresponding to transmission of the PUCCH, determining the T according to the number P of slots, and informing the terminal of the number P of slots corresponding to the PUCCH through an indication field or higher layer signaling in the PDCCH, wherein the PDCCH includes at least one of a downlink control channel for scheduling a downlink shared channel, a downlink control channel for indicating downlink semi-persistent scheduling (SPS) resource release, and a multicast downlink control channel at least for indicating a slot structure.

The determination of the T according to the number P of slots includes:

determining the T based on the size of a UL area of each of the P slots or the size of an area used for transmitting the PUCCH in the UL area of each of the P slot; or determining the T based on the corresponding relationship between T and different slot quantities which are predefined or preconfigured by higher layer signaling, wherein the different slot quantities which are predefined or preconfigured by higher layer signaling correspond to different total transmission lengths T.

Particularly, in some embodiments, the total transmission length T of the PUCCH to be transmitted in the multiple slots is determined according to the indication field in the PDCCH. The PDCCH includes at least one of a downlink control channel for scheduling a downlink shared channel, a downlink control channel for indicating downlink semi-persistent scheduling (SPS) resource release, and a multicast downlink control channel at least for indicating a slot structure. The total transmission length T of the PUCCH is indicated in the indication field, and at this point, the base station can directly determine the T according to the information in the indication field. Or the number P of slots for transmitting the PUCCH is indicated in the indication field, and at this point, the base station can determine the total transmission length T based on the value of P. The obtained values of slot quantity P or T are notified by the PDCCH, which is a dynamic notification method.

When the number P of slots is indicated, the base station may further determine the total transmission length T according to the number of slots in the following manner:

the base station determines a UL area or an area used for transmitting the PUCCH in the UL area according to the uplink and downlink structures of each slot in the P slots, and determines the total transmission length T according to a start and/or stop transmission symbol of the PUCCH in the UL area or the size of the PUCCH transmission area or the start and/or stop transmission of the PUCCH in the PUCCH transmission area; for example, it is agreed that in one slot, the PUCCH is always transmitted in the entire UL area in the slot, and of course the PUCCH can also be transmitted in a subset of the UL area, as long as the base station knows in advance; and the total transmission length T can be determined according to the number P of slots and the size of the UL area or the PUCCH transmission area in the UL area in each slot;

alternatively, the total transmission lengths corresponding to different slot quantities are pre-defined in a protocol or pre-configured by higher layer signaling, and the total transmission length T corresponding to the P value is determined according to the configured slot quantity P; for example, the total transmission lengths corresponding to different slot quantities are pre-defined in the protocol or pre-configured by higher layer signaling, for example, when each slot contains 7 symbols, 2 slots correspond to T=10 (an example only, other values are not excluded), and 3 slots correspond to T=18; when each slot contains 14 symbols, 2 slots correspond to T=20, and 3 slots correspond to T=30; when P=3, if each slot contains 7 symbols, the determined total transmission length T=18; when P=2, if each slot contains 14 symbols, the determined total transmission length T=20; and further, when the base station determines the number of slots, the corresponding total transmission length T can be determined.

In a second method, the total transmission length T is pre-configured by higher layer signaling.

Particularly, the higher layer signaling can directly configure the total transmission length T; or higher layer signaling configures the slot quantity P corresponding to the PUCCH, and the base station determines the total transmission length T according to the slot quantity P.

The determination of the T according to the number P of slots includes:

determining the T based on the size of a UL area of each of the P slots or the size of an area used for transmitting the PUCCH in the UL area of each of the P slot; or determining the T based on the corresponding relationship between T and different slot quantities which are predefined or preconfigured by higher layer signaling, wherein the different slot quantities which are predefined or preconfigured by higher layer signaling correspond to different total transmission lengths T.

Particularly, in some embodiments, a semi-static configuration mode is adopted, a base station side can send the configuration information for determining the total transmission length T to the terminal through higher layer signaling in advance, and upon receiving the higher layer signaling, the terminal can determine the total transmission length T for transmitting the PUCCH according to the configuration information. The method can be applied to periodic UCI feedback, such as P-CSI/SR, of course, application to HARQ-ACK transmission is not excluded. For example, the higher layer signaling directly configures the total transmission length T; or the higher layer signaling configures the slot quantity P corresponding to PUCCH transmission by the terminal, and the terminal determines the total transmission length T according to the slot quantity P.

When the number P of slots is configured, the base station can further determine the total transmission length T according to the number of slots in the following manner:

the base station determines a UL area or an area used for transmitting the PUCCH in the UL area according to the uplink and downlink structures of each slot in the P slots, and determines the total transmission length T according to a start and/or stop transmission symbol of the PUCCH in the UL area or the size of the PUCCH transmission area or the start and/or stop transmission of the PUCCH in the PUCCH transmission area; for example, it is agreed that in one slot, the PUCCH is always transmitted in the entire UL area in the slot, and of course the PUCCH can also be transmitted in a subset of the UL area, as long as the base station knows in advance; and the total transmission length T can be determined according to the number P of slots and the size of the UL area or the PUCCH transmission area in the UL area in each slot;

alternatively, the total transmission lengths corresponding to different slot quantities are pre-defined in a protocol or pre-configured by higher layer signaling, and the total transmission length T corresponding to the P value is determined according to the configured slot quantity P; for example, the total transmission lengths corresponding to different slot quantities are pre-defined in the protocol or pre-configured by higher layer signaling, for example, when each slot contains 7 symbols, 2 slots correspond to T=10 (an example only, other values are not excluded), and 3 slots correspond to T=18; when each slot contains 14 symbols, 2 slots correspond to T=20, and 3 slots correspond to T=30; when P=3, if each slot contains 7 symbols, the determined total transmission length T=18; when P=2, if each slot contains 14 symbols, the determined total transmission length T=20; and further, when the base station determines the number of slots, the corresponding total transmission length T can be determined.

In a third method, determining the T according to a predetermined agreement.

Particularly, in some embodiments, the method is applicable to periodic UCI feedback, such as P-CSI/SR. For example, the total transmission length T of the PUCCH in the P slots is agreed in advance in the protocol, and P and T can be fixed values or multiple values; if there is only one value, when the terminal turns on the multiple slots to transmit the PUCCH, the total transmission length of the PUCCH in the multiple slots is a fixed value T, and the number P of slots is also fixed, so no additional configuration is required; and if there are multiple values, P and/or T can be configured (configured by higher layer signaling or a downlink control channel), that is, similar to the first and second methods described above, the total transmission lengths corresponding to different P values can be different, and the total transmission length T is determined according to the configured P value.

Since different T values correspond to different transmission structures, the above step S502 may include the following substeps during specific implementation:

judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determining the transmission structure of the PUCCH based on the judgment result.

Particularly, in some embodiments, a first predetermined value X is preset in the base station, and the first predetermined value X is the maximum length (e.g., the maximum number of symbols, for example, X=14) or the minimum length (e.g., the minimum number of symbols, for example, X=4) supported by the PUCCH. Alternatively, the first predetermined value X is one of a plurality of predetermined lengths supported by the PUCCH (e.g., an integer value from 4 to 14 of symbols are predetermined as the length of the PUCCH, and X is selected from 4 to 14). Further, after determining the total transmission length T during transmission in the P slots by the methods in the above-mentioned step S501, the base station determines whether the T is greater than the first predetermined value X or not. Then the base station determines the transmission structure of the PUCCH according to the judgment result.

Further, in some embodiments, the determination of the transmission structure of the PUCCH based on the judgment result can be divided into the following two cases.

In a first case, when the judgment result is no, determining, from the predefined at least one transmission structure, a transmission structure with a number of symbol corresponding to the T as the transmission structure of the PUCCH, wherein in the predefined at least one transmission structure, different transmission structures correspond to different numbers of symbol.

Particularly, in some embodiments, different transmission structures corresponding to different numbers of symbol are predefined in the base station. For example, corresponding transmission structures are defined for a PUCCH with a length of 4-14 symbols respectively. For example, when the length is 4 symbols, the transmission structure is URRU or RURU; when the length is 5 symbols, the transmission structure is URRUU or RURUU; when the length is 7 symbols, the transmission structure is UURRRUU or URRUURUU; when the length is 8 symbols, the transmission structure is URRUURRU; when the length is 14 symbols, the transmission structure is UURRRUUUURR-RUU (no more examples will be given); wherein U represents the symbol position where uplink control information (UCI) is transmitted, and R represents the symbol position where a pilot is transmitted. When determining that the total transmission length T of the PUCCH to be transmitted during transmission in the P slots does not exceed the first predetermined value X, the base station determines that the transmission structure of the PUCCH is a transmission structure with symbol number corresponding to the total transmission length T in a plurality of predefined transmission structures of the PUCCH, for example, each transmission structure corresponds to one symbol length, a transmission structure with a symbol length the same as the total transmission length is selected, and the PUCCH is transmitted in the plurality of slots according to the transmission structure.

For example, assuming that a slot contains 7 symbols (OFDM or SC-FDMA symbols), the structure of slot i is DL for 2 symbols, GP for 1 symbol, UL for 4 symbols, and slot i+1 has a structure of full uplink, that is, all the 7 symbols are UL. Assuming that a determined HARQ feedback timing sequence is shown in FIG. 2, it may be that ACK/NACK for downlink transmission in the previous slot starts the feedback in an uplink area in the following slot, as shown in PUCCH1 in FIG. 2, or ACK/NACK for downlink transmission in the current slot starts the feedback in an uplink area in the current slot, as shown in PUCCH2 in FIG. 2. The HARQ feedback timing sequence relationship may be predefined, or may be configured by higher layer signaling or a related indication field in the downlink control channel.

Assuming the first predetermined value X=14, the base station determines that the PUCCH which needs to be received from the UL area of slot i occupies P=2 slots (for example, the 2 slots may be notified in a PDCCH corresponding to the PUCCH, or may be pre-agreed or configured). Then the base station determines the total transmission length T of the PUCCH in the 2 slots according to the first method, the second method or the third method in step S501. For periodic UCI, such as P-CSI/SR, if slot i is determined to be the receiving slot of P-CSI/SR according to the feedback period, the base station determines the total transmission length T of the PUCCH in the 2 slots according to the second method or the third method in step S501. Various PUCCH symbol lengths are predefined in the base station. The structure of each symbol length corresponds to the mapping method of a corresponding pilot and data symbol. For example, the total transmission length T=11 symbols and the base station determines T<X, therefore, the base station determines that in the 2 slots, UCI transmission is carried by only one PUCCH, and a PUCCH with a length of 11 symbols is received by using a predefined PUCCH structure with a length of 11 symbols, as shown in PUCCH3 in FIG. 2.

In a second case, when the judgment result is yes, dividing the T into A parts, wherein each of the A parts corresponds to an uplink control channel, the transmission length of each uplink control channel does not exceed the X, and each uplink control channel carries the same UCI information; and taking i as 1 to A in sequence, determining the transmission length of the uplink control channel corresponding to the i-th part as Mi, and determining, from the predefined at least one transmission structure, a transmission structure with a number of symbol corresponding to the Mi as the transmission structure of the uplink control channel corresponding to the i-th part, wherein in the at least one predefined transmission structure, different transmission structures correspond to different numbers of symbol.

Particularly, in some embodiments, when it is determined that the total transmission length T of the PUCCH to be received in the P slots exceeds the first predetermined value X, the base station needs to divide the PUCCH with the total transmission length T into A parts, each of the A parts corresponds to an uplink control channel, and the transmission length (e.g., the number of symbols) of each uplink control channel does not exceed X. Different transmission structures corresponding to different numbers of symbol are predefined in the base station, for example, the transmission structures corresponding to 4-14 symbols. If the transmission length of the uplink control channel corresponding to the i-th part in the A parts is Mi, then the transmission structure of the uplink control channel corresponding to the i-th part is determined to be a transmission structure with a number of symbol Mi. In this way, the transmission structure of the uplink control channel corresponding to each of the A parts can be determined, the corresponding uplink control channel is received in the part according to the transmission structure, and one uplink control channel corresponding to each part carries the same UCI information. That is, the base station is divided into A uplink control channels in the P slots, the A uplink control channels are received according to corresponding transmission structures respectively, and each uplink control channel carries the same UCI information.

In some embodiments, the division of the T into A parts includes but not limited to the following methods.

In a first method, determining that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X.

In a second method, determining that $$A = \left\lfloor \frac{T}{X} \right\rfloor + 1 \text{ or } \left\lceil \frac{T}{X} \right\rceil,$$

the length of each of the A-1 parts in the A parts is $$\left\lfloor \frac{T}{A} \right\rfloor,$$

and the length of one part in the A parts is $$T - \left\lfloor \frac{T}{A} \right\rfloor \times (A-1);$$

or the length of each of the A-1 parts in the A parts is $$\left\lceil \frac{T}{A} \right\rceil,$$

and the length of one part in the A parts is $$T - \left\lceil \frac{T}{A} \right\rceil \times (A-1).$$

In a third method, taking A as a second predetermined value, and determining the length of each of the A-1 parts in the A parts as $$\left\lfloor \frac{T}{A} \right\rfloor$$

and the length of one part in the A parts as $$T - \left\lfloor \frac{T}{A} \right\rfloor \times (A-1),$$

or determining the length of each of the A-1 parts in the A parts as $$\left\lceil \frac{T}{A} \right\rceil$$

and the length of one part in the A parts as $$T - \left\lceil \frac{T}{A} \right\rceil \times (A-1),$$

wherein the second predetermined value is agreed beforehand or determined according to the slot structure or baseband parameters or the number of slots occupied by the PUCCH.

The A-1 parts can be the first A-1 parts, or the last A-1 parts, or the predefined A-1 parts in the A parts, and the order of the A-1 parts in the A parts can be continuous or interleaved.

Particularly, the value of A can be agreed beforehand, for example, division into 2 parts is agreed; and the value of A can also be related to the slot structure or baseband parameters or the number of slots occupied by the PUCCH, for example, when a slot contains 7 symbols, it is agreed that A=2, and when a slot contains 14 symbols, it is agreed that A is the number of slots occupied by PUCCH reception.

Assuming that a slot contains 14 symbols (OFDM or SC-FDMA symbols), the structure of slot i is DL for 3 symbols, GP for 1 symbol, UL for 10 symbols, and slot i+1 has a structure of full uplink, that is, all the 14 symbols are UL. The current slot feedback mode is taken as an example of the HARQ feedback timing sequence, and other feedback modes are not excluded. For example, ACK/NACK for downlink transmission in the previous slot in FIG. 2 starts the feedback in an uplink area in the following slot, and the reception mode of the PUCCH is similar and will not be described again.

Assuming the first predetermined value X=14, the base station determines that the PUCCH which needs to be received from the UL area of slot i occupies P=2 slots (e.g., the 2 slots may be notified in the corresponding downlink control channel or may be pre-agreed or configured), the base station determines the total transmission length of the PUCCH in the 2 slots according to the first method, the second method or the third method in step S501. For example, the total transmission length T=24 symbols and the base station determines T>X, therefore, the base station determines that in the 2 slots, the same UCI transmission is carried by A PUCCHs.

The base station, according to the above first method, determines to divide the total transmission length T into $$A = \left\lceil \frac{T}{X} \right\rceil = 2$$

parts, for example, the length of the first part is X=T−X=10 and the length of the second part is T−(A×X=14, obtains two PUCCHs with different lengths, and determines the transmission structure of each PUCCH according to the lengths, wherein the same UCI is carried in the two PUCCHs for repeated transmission of UCI, as in the case of PUCCH1 and PUCCH2 in FIG. 3. Alternatively, the length of the first part is X=14 and the length of the second part is X=T−X=10, two PUCCHs with different lengths are obtained, the transmission structure of each PUCCH is determined according to the lengths, and the same UCI is carried in the two PUCCHs for repeated transmission of UCI, as in the case of PUCCH3 and PUCCH4 in FIG. 3.

The base station, according to the above second method, determines to divide the total transmission length T into $$A = \left\lceil \frac{T}{X} \right\rceil = 2$$

parts, or determined to divide the total transmission length T into A=2 parts according to the above third method, i.e., the second predetermined value is 2. Further, according to the second method or the third method, the length of the first part is determined to be $$\left\lfloor \frac{T}{A} \right\rfloor = 12$$

and the length of the second part is also determined to be 12, two PUCCHs with the same length are obtained, the transmission structure of each PUCCH is determined according to the length, and the same UCI is carried in the two PUCCHs for repeated transmission of UCI, as in the case of PUCCH5 and PUCCH6 in FIG. 3.

For periodic UCI, such as P-CSI/SR, if slot i is determined to be the transmission slot of P-CSI/SR according to the feedback period, the base station determines the total transmission length of the PUCCH in the 2 slots according to the second method or the third method in step S501, for example, T=24 symbols and the base station determines T>X, therefore, the base station determines that the same UCI transmission is carried by a plurality of PUCCHs in a plurality of slots, and the specific PUCCH transmission mode is the same as ACK/NACK, so no more detailed description here.

In another example in some embodiments, assuming that one slot contains 7 symbols (OFDM or SC-FDMA symbols), the structure of slot i is DL for 1 symbol, GP for 1 symbol, UL for 5 symbols, and the structures of slot i+1 and slot i+2 are full uplink, that is, all the 7 symbols are UL. The current slot feedback mode is taken as an example of the HARQ feedback timing sequence, and other feedback modes are not excluded, for example, ACK/NACK for downlink transmission in the previous slot in FIG. 1 starts the feedback in an uplink area in the following slot, and the receiving mode of the PUCCH is similar and will not be described again.

Assuming the first predetermined value X=14, the base station determines that the PUCCH which needs to be received from the UL area of slot i occupies 3 slots (e.g., the 3 slots may be notified in the corresponding downlink control channel or may be pre-agreed or configured), the base station determines the total transmission length of the PUCCH in the 3 slots according to the first method, the second method or the third method in step S501. For periodic UCI, such as P-CSI/SR, if slot i is determined to be the transmission slot of P-CSI/SR according to the feedback period, the base station determines the total transmission length of the PUCCH in the 3 slots according to the second method or the third method in step S501. For example, the total transmission length T=19 symbols and the base station determines T>X, therefore, the base station determines that in the multiple slots, the same UCI transmission is carried by multiple PUCCHs.

The base station, according to the above first method, determines to divide the total transmission length T into $$A = \left\lceil \frac{T}{X} \right\rceil = 2$$

parts, for example, the length of the first part is X=T−X=5 and the length of the second part is X=14, obtains two PUCCHs with different lengths, and determines the transmission structure of each PUCCH according to the lengths, wherein the same UCI is carried in the two PUCCHs for repeated transmission of UCI, as in the case of PUCCH1 and PUCCH2 in FIG. 4. Alternatively, the length of the first part is X=14 and the length of the second part is X=T−X=5, two PUCCHs with different lengths are obtained, the transmission structure of each PUCCH is determined according to the lengths, and the same UCI is carried in the two PUCCHs for repeated transmission of UCI, as in the case of PUCCH3 and PUCCH4 in FIG. 4.

The base station, according to the above second method, determines to divide the total transmission length T into $$A = \left\lceil \frac{T}{X} \right\rceil = 2$$

parts, or according to the third method, determines to divide the total transmission length T into A=2 parts, further according to the second method or the third method, determines the length of the first part as $$\left\lfloor \frac{T}{A} \right\rfloor = 9$$

and the length of the second part as 10, obtains two PUCCHs with different lengths, and determines the transmission structure of each PUCCH according to the lengths, wherein the same UCI is carried in the two PUCCHs for repeated transmission of UCI, as in the case of PUCCH5 and PUCCH6 in FIG. 4. Alternatively, the length of the first part is determined to be $$\left\lfloor \frac{T}{A} \right\rfloor = 10$$

and the length of the second part is 9, two PUCCHs with different lengths are obtained, the transmission structure of each PUCCH is determined according to the lengths, and the same UCI is carried in the two PUCCHs for repeated transmission of UCI, as in the case of PUCCH7 and PUCCH8 in FIG. 4.

For periodic UCI, such as P-CSI/SR, if slot i is determined to be the transmission slot of P-CSI/SR according to the feedback period, the base station determines the total transmission length of the PUCCH in the 2 slots according to the second method or the third method in step S501, for example, T=19 symbols and the base station determines T>X, therefore, the base station determines that the same UCI transmission is carried by a plurality of PUCCHs in a plurality of slots, and the specific PUCCH transmission mode is the same as ACK/NACK, so no more detailed description here.

Figure 6:
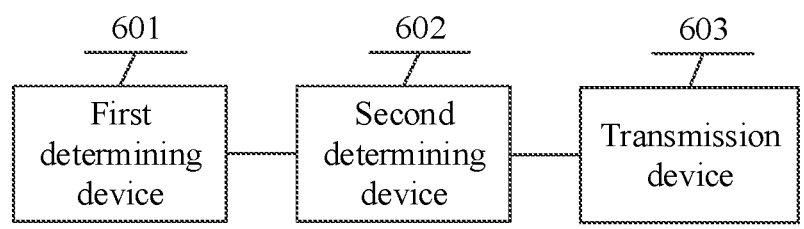
FIG. 6 is a schematic structural diagram of a terminal in a third embodiment of the present application.

Based on the same inventive concept, the third embodiment of the present application provides a terminal. The specific implementation of the terminal can be seen in the description of the first embodiment, so no more detailed description here. As shown in FIG. 6, the terminal mainly includes:

a first determining device 601 configured to determine a total transmission length T of an uplink control channel (PUCCH) to be transmitted in P slots;

a second determining device 602 configured to determine the transmission structure of the PUCCH on the basis of T; and a transmission device 603 configured to transmit the PUCCH in the P slots according to the transmission structure.

In a possible embodiment, the first determining device 601 is particularly configured to:

determine the T according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure; or, determine the T according to configuration information of higher layer signaling; or, determine the T according to a predetermined agreement.

In a possible embodiment, the first determining device 601 is particularly configured to:

indicate a total transmission length corresponding to transmission of the PUCCH by the indication field; or, indicate the number P of slots corresponding to transmission of the PUCCH by the indication field, and determine the T according to the number P of slots.

In a possible embodiment, the first determining device 601 is particularly configured to:

indicate a total transmission length corresponding to transmission of the PUCCH by the configuration information; or, indicate the number P of slots corresponding to transmission of the PUCCH by the configuration information, and determine the T according to the number P of slots.

In a possible embodiment, the first determining device 601 is particularly configured to:

determine the T based on the size of a UL area of each of the P slots or the size of an area used for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the second determining device 602 is particularly configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the second determining device 602 is further configured to:

when the judgment result is no, determine, from the predefined at least one transmission structure, a transmission structure with a number of symbol corresponding to the T as the transmission structure of the PUCCH, wherein in the predefined at least one transmission structure, different transmission structures correspond to different numbers of symbol.

In a possible embodiment, the second determining device 602 is further configured to:

when the judgment result is yes, divide the T into A parts, wherein each of the A parts corresponds to an uplink control channel, the transmission length of each uplink control channel does not exceed the X, and each uplink control channel carries the same UCI information; and take i as 1 to A in sequence, determine the transmission length of the uplink control channel corresponding to the i-th part as $M_i$, and determine, from the predefined at least one transmission structure, a transmission structure with a number of symbol corresponding to the $M_i$ as the transmission structure of the uplink control channel corresponding to the i-th part, wherein in the at least one predefined transmission structure, different transmission structures correspond to different numbers of symbol.

In a possible embodiment, the second determining device 602 is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or the number of slots occupied by the PUCCH; or take A as a second predetermined value, and determine the length of each of the A−1 parts in the A parts $$\left\lceil \frac{T}{A} \right\rceil,$$

and the length of one part in the A parts as $$T - \left\lceil \frac{T}{A} \right\rceil \times (A - 1),$$

wherein the second predetermined value is agreed beforehand or determined according to the slot structure or baseband parameters or the number of slots occupied by the PUCCH.

Figure 7:
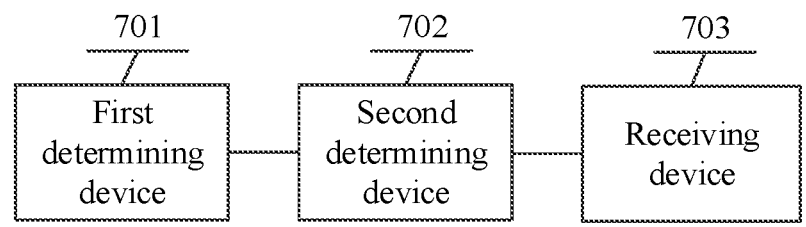
FIG. 7 is a schematic structural diagram of a base station in a fourth embodiment of the present application.

Based on the same inventive concept, the fourth embodiment of the present application provides a base station. The specific implementation of the base station can be seen in the description of the second embodiment, so no more detailed description here. As shown in FIG. 7, the base station mainly includes:

a first determining device 701 configured to determine a total transmission length T of an uplink control channel (PUCCH) to be transmitted in P slots;

a second determining device 702 configured to determine the transmission structure of the PUCCH on the basis of T; and a receiving device 703 configured to receive the PUCCH in the P slots according to the transmission structure.

In a possible embodiment, the first determining device 701 is particularly configured to:

determine the T and informing a terminal of the T through an indication field or higher layer signaling in a downlink control channel (PDCCH); or determine the number P of slots corresponding to transmission of the PUCCH, determine the T according to the number P of slots, and inform the terminal of the number P of slots corresponding to the PUCCH through an indication field or higher layer signaling in the PDCCH; or determine the T according to a predetermined agreement;

wherein the PDCCH includes at least one of a downlink control channel for scheduling a downlink shared channel, a downlink control channel for indicating downlink semi-persistent scheduling (SPS) resource release, and a multicast downlink control channel at least for indicating a slot structure. In a possible embodiment, the first determining device 701 is further configured to:

determine the T based on the size of a UL area of each of the P slots or the size of an area used for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the second determining device 702 is particularly configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the second determining device 702 is further configured to: when the judgment result is no, determine, from the predefined at least one transmission structure, a transmission structure with a number of symbol corresponding to the T as the transmission structure of the PUCCH, wherein in the predefined at least one transmission structure, different transmission structures correspond to different numbers of symbol.

In a possible embodiment, the second determining device 702 is further configured to: when the judgment result is yes, divide the T into A parts, wherein each of the A parts corresponds to an uplink control channel, the transmission length of each uplink control channel does not exceed the X, and each uplink control channel carries the same UCI information; and take i as 1 to A in sequence, determining the transmission length of the uplink control channel corresponding to the i-th part as $M_i$, and determining, from the predefined at least one transmission structure, a transmission structure with a number of symbol corresponding to the $M_i$ as the transmission structure of the uplink control channel corresponding to the i-th part, wherein in the at least one predefined transmission structure, different transmission structures correspond to different numbers of symbol.

In a possible embodiment, the second determining device 702 is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A - 1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or
take A as a second predetermined value, and determine the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or the number of slots occupied by the PUCCH; or take A as a second predetermined value, and determine the length of each of the A−1 parts in the A parts $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or the number of slots occupied by the PUCCH.

Figure 8:
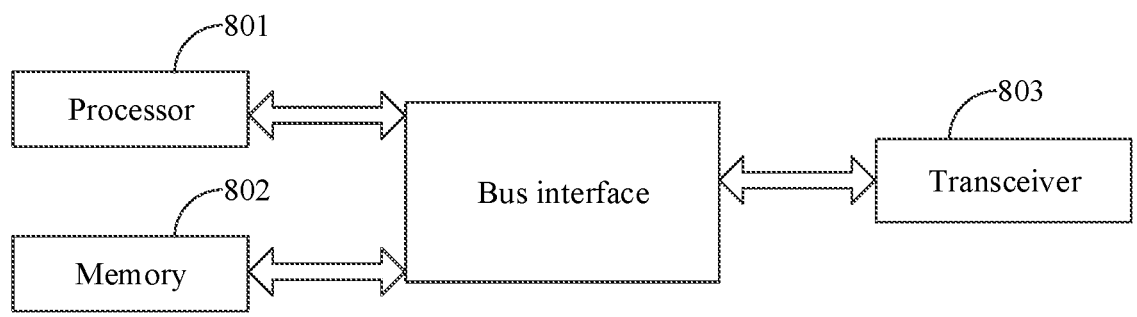
FIG. 8 is a schematic structural diagram of a device in a fifth embodiment of the present application.

Based on the same inventive concept, the fifth embodiment of the present application provides a device which is applied to a terminal. The specific implementation of the device can be seen in the description of the first embodiment, so no more detailed description here. As shown in FIG. 8, the device mainly includes a processor 801, a memory 802 and a transceiver 803, wherein the transceiver 803 receives and transmits data under the control of the processor 801, a preset program is stored in the memory 802, the processor 801 reads the program in the memory 802, and the following processes are executed according to the program:

the processor 801 determines a total transmission length T of an uplink control channel (PUCCH) to be transmitted in P slots;

the processor 801 determines the transmission structure of the PUCCH on the basis of T; and the transceiver 803 transmits the PUCCH in the P slots according to the transmission structure.

In FIG. 8, a bus architecture may include any number of interconnected buses and bridges, which are particularly linked by various circuits of one or more processors 801 represented by the processor 801 and memories represented by the memory 802. The bus architecture can also link various other circuits such as peripheral devices, voltage regulators, and power management circuits, which are well known in the art, and therefore will not be further described herein. A bus interface provides an interface. The transceiver 803 may be a plurality of elements, i.e., including a transmitter and a transceiver, providing a unit for communicating with various other devices over a transmission medium. The processor 801 is responsible for managing the bus architecture and normal processing, and the memory 802 can store data used by the processor 801 when performing operations.

In a possible embodiment, the processor 801 is further configured to:

determine the T according to an indication field in a downlink control channel (PDCCH), wherein the PDCCH includes at least one of a downlink control channel for scheduling a downlink shared channel, a downlink control channel for indicating downlink semi-persistent scheduling (SPS) resource release, and a multicast downlink control channel at least for indicating a slot structure; or, determine the T according to configuration information of higher layer signaling; or, determine the T according to a predetermined agreement.

In a possible embodiment, the processor 801 is further configured to:

indicate a total transmission length corresponding to transmission of the PUCCH by the indication field; or, indicate the number P of slots corresponding to transmission of the PUCCH by the indication field, and determine the T according to the number P of slots.

In a possible embodiment, the processor 801 is further configured to:

indicate a total transmission length corresponding to transmission of the PUCCH by the configuration information; or, indicate the number P of slots corresponding to transmission of the PUCCH by the configuration information, and determine the T according to the number P of slots.

In a possible embodiment, the processor 801 is further configured to:

determine the T based on the size of a UL area of each of the P slots or the size of an area used for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the processor 801 is further configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the processor 801 is further configured to:

when the judgment result is no, determine, from the predefined at least one transmission structure, a transmission structure with a number of symbol corresponding to the T as the transmission structure of the PUCCH, wherein in the predefined at least one transmission structure, different transmission structures correspond to different numbers of symbol.

In a possible embodiment, the processor 801 is further configured to:

when the judgment result is yes, divide the T into A parts, wherein each of the A parts corresponds to an uplink control channel, the transmission length of each uplink control channel does not exceed the X, and each uplink control channel carries the same UCI information; and take i as 1 to A in sequence, determining the transmission length of the uplink control channel corresponding to the i-th part as $M_i$, and determining, from the predefined at least one transmission structure, a transmission structure with a number of symbol corresponding to the $M_i$ as the transmission structure of the uplink control channel corresponding to the i-th part, wherein in the at least one predefined transmission structure, different transmission structures correspond to different numbers of symbol.

In a possible embodiment, the processor 801 is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X;

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A-1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of one part in the A parts is $$T - \left\lceil \frac{T}{A} \right\rceil \times (A-1);$$

or take A as a second predetermined value, and determining the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or the number of slots occupied by the PUCCH; or take A as a second predetermined value, and determine the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or the number of slots occupied by the PUCCH.

Figure 9:
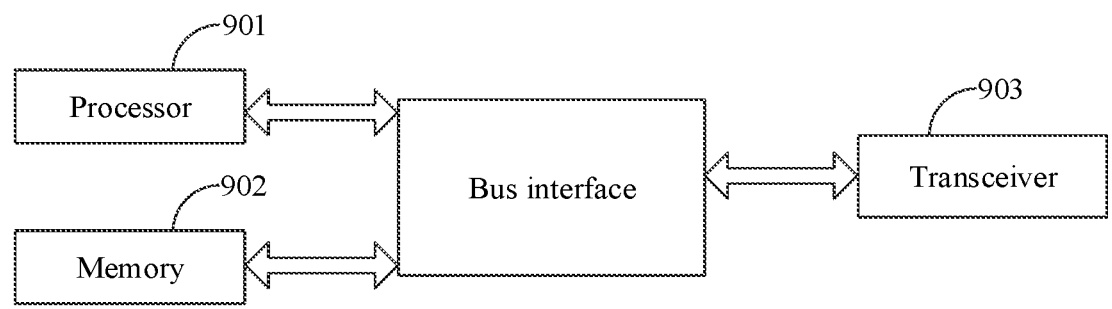
FIG. 9 is a schematic structural diagram of a device in a sixth embodiment of the present application.

Based on the same inventive concept, the sixth embodiment of the present application provides a device which is applied to a base station. The specific implementation of the device can be seen in the description of the second embodiment, so no more detailed description here. As shown in FIG. 9, the device mainly includes a processor 901, a memory 902 and a transceiver 903, wherein the transceiver 903 receives and transmits data under the control of the processor 901, a preset program is stored in the memory 902, the processor 901 reads the program in the memory 902, and the following processes are executed according to the program:

the processor 901 determines a total transmission length T of an uplink control channel (PUCCH) to be transmitted in P slots;

the processor 901 determines the transmission structure of the PUCCH on the basis of T; and the transceiver 903 receives the PUCCH in the P slots according to the transmission structure.

In FIG. 9, a bus architecture may include any number of interconnected buses and bridges, which are particularly linked by various circuits of one or more processors 901 represented by the processor 901 and memories represented by the memory 902. The bus architecture can also link various other circuits such as peripheral devices, voltage regulators, and power management circuits, which are well known in the art, and therefore will not be further described herein. A bus interface provides an interface. The transceiver 903 may be a plurality of elements, i.e., including a transmitter and a transceiver, providing a unit for communicating with various other devices over a transmission medium. The processor 901 is responsible for managing the bus architecture and normal processing, and the memory 902 can store data used by the processor 901 when performing operations.

In a possible embodiment, the processor 901 is further configured to:

determine the T and inform a terminal of the T through an indication field or higher layer signaling in a downlink control channel (PDCCH); or determine the number P of slots corresponding to transmission of the PUCCH, determine the T according to the number P of slots, and inform the terminal of the number P of slots corresponding to the PUCCH through an indication field or higher layer signaling in the PDCCH; or determine the T according to a predetermined agreement;

wherein the PDCCH includes at least one of a downlink control channel for scheduling a downlink shared channel, a downlink control channel for indicating downlink semi-persistent scheduling (SPS) resource release, or a multicast downlink control channel at least for indicating a slot structure. In a possible embodiment, the processor 901 is further configured to:

determine the T based on the size of a UL area of each of the P slots or the size of an area used for transmitting the PUCCH in the UL area of each of the P slot; or determine the T based on the corresponding relationship between T and different slot quantities which are predefined or preconfigured by higher layer signaling, wherein the different slot quantities which are predefined or preconfigured by higher layer signaling correspond to different total transmission lengths T.

In a possible embodiment, the processor 901 is further configured to:

judge whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and determine the transmission structure of the PUCCH based on the judgment result.

In a possible embodiment, the processor 901 is further configured to:

when the judgment result is no, determine, from the predefined at least one transmission structure, a transmission structure with a number of symbol corresponding to the T as the transmission structure of the PUCCH, wherein in the predefined at least one transmission structure, different transmission structures correspond to different numbers of symbol.

In a possible embodiment, the processor 901 is further configured to:

when the judgment result is yes, divide the T into A parts, wherein each of the A parts corresponds to an uplink control channel, the transmission length of each uplink control channel does not exceed the X, and each uplink control channel carries the same UCI information; and take i as 1 to A in sequence, determine the transmission length of the uplink control channel corresponding to the i-th part as $M_i$, and determine, from the predefined at least one transmission structure, a transmission structure with a number of symbol corresponding to the as the transmission structure of the uplink control channel corresponding to the i-th part, wherein in the at least one predefined transmission structure, different transmission structures correspond to different numbers of symbol.

In a possible embodiment, the processor 901 is further configured to:

determine that $$A = \left\lfloor \frac{T}{X} \right\rfloor + 1 \text{ or } \left\lceil \frac{T}{X} \right\rceil,$$

wherein the length of each of the A−1 parts in the A parts is X, and the length of one part in the A parts is T−(A−1)×X; or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lfloor \frac{T}{A} \right\rfloor,$$

and the length of one part in the A parts is $$T - \left\lfloor \frac{T}{A} \right\rfloor \times (A - 1);$$

or determine that $$A = \left\lfloor \frac{T}{X} \right\rfloor + 1 \text{ or } \left\lceil \frac{T}{X} \right\rceil,$$

wherein the length of each of the A−1 parts in the A parts is $$\left\lceil \frac{T}{A} \right\rceil,$$

and the length of on part in the A parts is $$T - \left\lceil \frac{T}{A} \right\rceil \times (A - 1);$$

or take A as a second predetermined value, and determining the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or the number of slots occupied by the PUCCH; or take A as a second predetermined value, and determining the length of each of the A−1 parts in the A parts as $$\left\lceil \frac{T}{A} \right\rceil,$$

and the length of one part in the A parts as $$T - \left\lceil \frac{T}{A} \right\rceil \times (A-1),$$

wherein the second predetermined value is agreed beforehand or determined according to the slot structure or baseband parameters or the number of slots occupied by the PUCCH.

The above method provided by the embodiments of the present application can be applied to terminal equipment as well as network equipment.

Terminal equipment can also be referred to as user equipment (UE), mobile station (MS), mobile terminal, etc. In one embodiment, the terminal may have the ability to communicate with one or more core networks via a radio access network (RAN). For example, the terminal may be a mobile phone (or called a "cellular" phone), or a mobile computer. For example, the terminal may also be a portable, pocket-sized, handheld, computer built-in type or vehicle-mounted mobile device.

Network equipment may be a base station (e.g., an access point), which refers to a device in an access network which communicates with a wireless terminal over an air interface through one or more sectors. The base station can be used for interconversion of received air frames and IP packets as a router between the wireless terminal and the rest of the access network, which may include an Internet Protocol (IP) network. The base station may also coordinate attribute management of the air interface. For example, the base station may be a base transceiver station (BTS) in GSM or CDMA, a base station in WCDMA (NodeB), an evolutional base station in LTE (NodeB or eNB or e-NodeB, evolutional Node B), or gNB in a 5G system. This aspect is not limited in the embodiments.

The embodiments of the present application provide a computer storage medium for storing computer program instructions for the above device provided by the embodiments of the present application, which includes a program for executing any of the methods provided by the embodiments of the present application.

The computer storage medium may be any available medium or data storage device accessible by a computer, including but not limited to magnetic memory (e.g., floppy disk, hard disk, magnetic tape, magneto-optical disk [MO]), optical memory (e.g., CD, DVD, BD, HVD), and semiconductor memory (e.g., ROM, EPROM, EEPROM, non-volatile memory [NAND FLASH], solid state disk [SSD]).

Based on the above technical scheme, the embodiments of the present application provide an uplink control channel transmission method. A terminal determines a total transmission length of a PUCCH to be transmitted in multiple slots, determines a transmission structure of the PUCCH on the basis of the total transmission length, and transmits the PUCCH in the multiple slots according to the transmission structure of the PUCCH. A base station receives the PUCCH according to the transmission structure of the PUCCH in the multiple slots. Thus, the problem, in the prior art, that no relevant solution addresses how to perform long NR-PUCCH transmission in multiple slots is effectively solved, realizing the normal transmission of the long PUCCH in multiple slots.

Those skilled in the art will appreciate that embodiments of the present application may be provided as methods, systems, or computer program products. Therefore, the present application may take the form of an entirely hardware embodiment, an entirely software embodiment, or an embodiment combining software and hardware aspects. Furthermore, the present application may take the form of a computer program product implemented on one or more computer usable storage media (including but not limited to magnetic disk memory, CD-ROM, optical memory, etc.) having computer usable program code embodied therein.

The present application is described with reference to flowcharts and/or block diagrams of methods, equipment (systems), and computer program products according to the embodiments of the present application. It should be understood that each flow and/or block in the flowchart and/or block diagram, and combinations of flows and/or blocks in the flowchart and/or block diagram, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce means for implementing the functions specified in the flowchart flow or flows and/or block or blocks of the block diagram.

These computer program instructions may also be stored in a computer-readable memory which can direct a computer or other programmable data processing apparatus to function in a particular manner, such that the instructions stored in the computer-readable memory produce an article of manufacture including a command device which implements the functions specified in the flow or flows of the flowchart and/or block or blocks of the block diagram.

These computer program instructions may also be loaded onto a computer or other programmable data processing apparatus such that a series of operational steps are performed on the computer or other programmable apparatus to produce a computer implemented process, such that the instructions that execute on the computer or other programmable apparatus provide steps for implementing the functions specified in the flowchart flow or flows and/or block or blocks of the block diagram.

Although the embodiments of the present application have been described, those skilled in the art can make additional changes and modifications to these embodiments once they have learned the basic inventive concepts. Therefore, the appended claims are intended to be interpreted as including the embodiments and all changes and modifications falling within the scope of the present application.

Obviously, those skilled in the art can make various changes and modifications to the embodiments of the present application without departing from the spirit and scope of the embodiments of the present application. Thus, if these modifications and variations of the embodiments of the present application fall within the scope of the claims of the present application and their equivalents, the present application is also intended to include such modifications and variations.

What is claimed is:

1. An uplink control channel transmission method, applied to a terminal, the method comprising:
   determining a total transmission length T of an uplink control channel (PUCCH) to be transmitted in P slots;
   determining a transmission structure of the PUCCH on the basis of T; and
   transmitting the PUCCH in the P slots according to the transmission structure;
   wherein the determining the transmission structure of the PUCCH on the basis of the T comprises:
   judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and
   determining the transmission structure of the PUCCH based on the judgment result.

2. The method according to claim 1, wherein the determining the total transmission length T of the PUCCH to be transmitted in P slots comprises:
   determining the T according to an indication field in a downlink control channel (PDCCH), wherein the PDCCH comprises at least one of a downlink control channel for scheduling a downlink shared channel, a downlink control channel for indicating downlink semi-persistent scheduling (SPS) resource release, or a multicast downlink control channel at least for indicating a slot structure; or,
   determining the T according to configuration information of higher layer signaling; or,
   determining the T according to a predetermined agreement.

3. The method according to claim 2, wherein the determining the T according to the indication field in the PDCCH comprises:
   indicating by the indication field a total transmission length corresponding to transmission of the PUCCH; or,
   indicating by the indication field a quantity P of slots corresponding to transmission of the PUCCH, and determining the T according to the quantity P of slots;
   wherein the determining the T according to the configuration information of the higher layer signaling comprises:
   indicating by the configuration information a total transmission length corresponding to transmission of the PUCCH; or,
   indicating by the configuration information a quantity P of slots corresponding to transmission of the PUCCH, and determining the T according to the quantity P of slots.

4. The method according to claim 3, wherein the determination of the T according to the quantity P of slots comprises:
   determining the T based on a size of a UL area of each of the P slots or a size of an area for transmitting the PUCCH in the UL area of each of the P slot; or
   determining the T based on a corresponding relationship between T and different slot quantities which are predefined or preconfigured by higher layer signaling, wherein the different slot quantities which are predefined or preconfigured by higher layer signaling correspond to different total transmission lengths T.

5. The method according to claim 1, wherein the determining the transmission structure of the PUCCH based on the judgment result comprises:
   when the T is not greater than a first predetermined value X, determining, from at least one of predefined transmission structures, a transmission structure with a symbol number corresponding to the T as the transmission structure of the PUCCH, wherein in at least one of the predefined transmission structures, different transmission structures correspond to different numbers of symbol;
   or
   when the T is greater than a first predetermined value X, dividing the T into A parts, wherein each of the A parts corresponds to an uplink control channel, a transmission length of each uplink control channel does not exceed the X, and each uplink control channel carries a same UCI information; and taking i as 1 to A in sequence, determining the transmission length of the uplink control channel corresponding to the i-th part as $M_i$, and determining, from at least one of the predefined transmission structures, a transmission structure with a number of symbol corresponding to the $M_i$ as the transmission structure of the uplink control channel corresponding to the i-th part, wherein in the at least one of the predefined transmission structures, different transmission structures correspond to different numbers of symbol.

6. The method according to claim 5, wherein the dividing the T into A parts comprises:
   determining that $$A = \left\lfloor \frac{T}{X} \right\rfloor + 1 \text{ or } \left\lceil \frac{T}{X} \right\rceil,$$

wherein a length of each of the A−1 parts in the A parts is X, and a length of one part in the A parts is T−(A−1)×X; or
   determining that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lfloor \frac{T}{A} \right\rfloor,$$

and a length of one part in the A parts is $$T - \left\lfloor \frac{T}{A} \right\rfloor \times (A-1);$$

or
determining that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lceil \frac{T}{A} \right\rceil,$$

and a length of one part in the A parts is $$T - \left\lceil \frac{T}{A} \right\rceil \times (A-1);$$

or
taking A as a second predetermined value, and determining the length of each of the A−1 parts in the A parts as $$\left\lfloor \frac{T}{A} \right\rfloor,$$

and the length of one part in the A parts as $$T - \left\lfloor \frac{T}{A} \right\rfloor \times (A-1),$$

wherein the second predetermined value is agreed beforehand or determined according to the slot structure or baseband parameters or the number of slots occupied by the PUCCH; or taking A as a second predetermined value, and determining a length of each of the A−1 parts in the A parts as $$\left\lceil \frac{T}{A} \right\rceil,$$

and a length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

7. An uplink control channel transmission method, applied to a base station, the method comprising:
determining a total transmission length T of an uplink control channel (PUCCH) to be transmitted in P slots;
determining a transmission structure of the PUCCH on the basis of T; and
receiving the PUCCH in the P slots according to the transmission structure;
wherein the determining the transmission structure of the PUCCH on the basis of the T comprises:
judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and
determining the transmission structure of the PUCCH based on the judgment result.

8. The method according to claim 7, wherein the determining the total transmission length T of the PUCCH to be transmitted in P slots comprises:
determining the T and informing a terminal of the T through an indication field or higher layer signaling in a downlink control channel (PDCCH); or
determining a quantity P of slots corresponding to transmission of the PUCCH, determining the T according to the quantity P of slots, and informing the terminal of the number P of slots corresponding to the PUCCH through an indication field or higher layer signaling in the PDCCH; or
determining the T according to a predetermined agreement;
wherein the PDCCH comprises at least one of a downlink control channel for scheduling a downlink shared channel, a downlink control channel for indicating downlink semi-persistent scheduling (SPS) resource release, or a multicast downlink control channel at least for indicating a slot structure.

9. The method according to claim 8, wherein the determining the T according to the quantity P of slots comprises:
determining the T based on a size of a UL area of each of the P slots or a size of an area for transmitting the PUCCH in the UL area of each of the P slot; or
determining the T based on a corresponding relationship between T and different slot quantities which are predefined or preconfigured by higher layer signaling, wherein the different slot quantities which are predefined or preconfigured by higher layer signaling correspond to different total transmission lengths T.

10. The method according to claim 7, wherein the determining the transmission structure of the PUCCH based on the judgment result comprises:
when the T is not greater than the first predetermined value X, determining, from at least one of predefined transmission structures, a transmission structure with a symbol number corresponding to the T as the transmission structure of the PUCCH, wherein in at least one of the predefined transmission structures, different transmission structures correspond to different numbers of symbol;
or
when the T is greater than the first predetermined value X, dividing the T into A parts, wherein each of the A parts corresponds to an uplink control channel, a transmission length of each uplink control channel does not exceed the X, and each uplink control channel carries a same UCI information; and taking i as 1 to A in sequence, determining the transmission length of the uplink control channel corresponding to the i-th part as $M_i$, and determining, from at least one of predefined transmission structures, a transmission structure with a symbol number corresponding to the $M_i$ as the transmission structure of the uplink control channel corresponding to the i-th part, wherein in at least one of the predefined transmission structures, different transmission structures correspond to different numbers of symbol.

11. The method according to claim 10, wherein the dividing the T into A parts comprises:

determining that $$A = \left\lfloor \frac{T}{X} \right\rfloor + 1 \text{ or } \left\lceil \frac{T}{X} \right\rceil,$$

wherein a length of each of the A−1 parts in the A parts is X, and a length of one part in the A parts is T−(A−1)×X; or determining that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lfloor \frac{T}{A} \right\rfloor,$$

and a length of one part in the A parts is $$T - \left\lfloor \frac{T}{A} \right\rfloor \times (A-1);$$

or determining that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lceil \frac{T}{A} \right\rceil,$$

and a length of one part in the A parts is $$T - \left\lceil \frac{T}{A} \right\rceil \times (A-1);$$

or taking A as a second predetermined value, and determining a length of each of the A−1 parts in the A parts as $$\left\lfloor \frac{T}{A} \right\rfloor,$$

and a length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or taking A as a second predetermined value, and determining a length of each of the A−1 parts in the A parts as $$\left\lceil \frac{T}{A} \right\rceil,$$

and a length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

12. A terminal, comprising a memory configured to store a computer readable program, and a processor configured to read the memory to execute the computer readable program to:
determine a total transmission length T of an uplink control channel (PUCCH) to be transmitted in P slots;
determine a transmission structure of the PUCCH on the basis of T; and
transmit the PUCCH in the P slots according to the transmission structure;
wherein the determine a transmission structure of the PUCCH on the basis of T, comprises:
judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and
determining the transmission structure of the PUCCH based on the judgment result.

13. The terminal according to claim 12, wherein the processor is configured to read the memory to execute the computer readable program to:
determine the T according to an indication field in a downlink control channel (PDCCH), wherein the PDCCH comprises at least one of a downlink control channel for scheduling a downlink shared channel, a downlink control channel for indicating downlink semi-persistent scheduling (SPS) resource release, or a multicast downlink control channel at least for indicating a slot structure; or,
determine the T according to configuration information of higher layer signaling; or,
determine the T according to a predetermined agreement.

14. The terminal according to claim 13, wherein the processor is configured to read the memory to execute the computer readable program to:
indicate by the indication field, a total transmission length corresponding to transmission of the PUCCH; or, indicate by the indication field, a quantity P of slots corresponding to transmission of the PUCCH, and determine the T according to the quantity P of slots; or indicate by the configuration information, a total transmission length corresponding to transmission of the PUCCH; or, indicate by the configuration information, a quantity P of slots corresponding to transmission of the PUCCH, and determine the T according to the quantity P of slots.

15. The terminal according to claim 14, wherein the processor is configured to read the memory to execute the computer readable program to:

determine the T based on a size of a UL area of each of the P slots or a size of an area for transmitting the PUCCH in the UL area of each of the P slot; or determine the T based on a corresponding relationship between T and different slot quantities which are predefined or preconfigured by higher layer signaling, wherein the different slot quantities which are predefined or preconfigured by higher layer signaling correspond to different total transmission lengths T.

16. The terminal according to claim 12, wherein the processor is configured to read the memory to execute the computer readable program to:

when the T is not greater than the first predetermined value X, determine, from at least one of predefined transmission structures, a transmission structure with a symbol number corresponding to the T as the transmission structure of the PUCCH, wherein in at least one of the transmission structures, different transmission structures correspond to different numbers of symbol;

or when the T is greater than the first predetermined value X, divide the T into A parts, wherein each of the A parts corresponds to an uplink control channel, a transmission length of each uplink control channel does not exceed the X, and each uplink control channel carries a same UCI information; and take i as 1 to A in sequence, determine the transmission length of the uplink control channel corresponding to the i-th part as $M_i$, and determine, from at least one of predefined transmission structures, a transmission structure with a symbol number corresponding to the $M_i$ as the transmission structure of the uplink control channel corresponding to the i-th part, wherein in at least one of the predefined transmission structures, different transmission structures correspond to different numbers of symbol.

17. The terminal according to claim 16, wherein the processor is configured to read the memory to execute the computer readable program to:

determine that $$A = \left\lfloor \frac{T}{X} \right\rfloor + 1 \text{ or } \left\lceil \frac{T}{X} \right\rceil,$$

wherein a length of each of the A−1 parts in the A parts is X, and a length of one part in the A parts is T−(A−1)×X; or determine that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lfloor \frac{T}{A} \right\rfloor,$$

and a length of one part in the A parts is $$T - \left\lfloor \frac{T}{A} \right\rfloor \times (A-1);$$

or determine that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lceil \frac{T}{A} \right\rceil,$$

and a length of one part in the A parts is $$T - \left\lceil \frac{T}{A} \right\rceil \times (A-1);$$

or take A as a second predetermined value, and determine a length of each of the A−1 parts in the A parts as $$\left\lfloor \frac{T}{A} \right\rfloor,$$

and a length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or take A as a second predetermined value, and determine a length of each of the A−1 parts in the A parts as $$\left\lceil \frac{T}{A} \right\rceil,$$

and a length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

18. A base station, comprising: a memory configured to store a computer readable program, and a processor configured to read the memory to execute the computer readable program to:
- determine a total transmission length T of an uplink control channel (PUCCH) to be transmitted in P slots;
- determine the transmission structure of the PUCCH on the basis of T; and
- receive the PUCCH in the P slots according to the transmission structure;
- wherein the determine the transmission structure of the PUCCH on the basis of T, comprises:
- judging whether the T is greater than a first predetermined value X to obtain a judgment result, wherein the X is any one value of a maximum length supported by the PUCCH, a minimum length supported by the PUCCH, and one value of multiple predetermined lengths supported by the PUCCH; and
- determining the transmission structure of the PUCCH based on the judgment result.

19. The base station according to claim 18, wherein the processor is configured to read the memory to execute the computer readable program to:
- determine the T and inform a terminal of the T through an indication field or higher layer signaling in a downlink control channel (PDCCH); or
- determine a quantity P of slots corresponding to transmission of the PUCCH, determine the T according to the quantity P of slots, and inform the terminal of the quantity P of slots corresponding to the PUCCH through an indication field or higher layer signaling in the PDCCH; or
- determine the T according to a predetermined agreement;
- wherein the PDCCH comprises at least one of a downlink control channel for scheduling a downlink shared channel, a downlink control channel for indicating downlink semi-persistent scheduling (SPS) resource release, or a multicast downlink control channel at least for indicating a slot structure.

20. The base station according to claim 19, wherein the processor is configured to read the memory to execute the computer readable program to:
- determine the T based on a size of a UL area of each of the P slots or a size of an area for transmitting the PUCCH in the UL area of each of the P slot; or
- determine the T based on a corresponding relationship between T and different slot quantities which are predefined or preconfigured by higher layer signaling, wherein the different slot quantities which are predefined or preconfigured by higher layer signaling correspond to different total transmission lengths T.

21. The base station according to claim 6, wherein the processor is configured to read the memory to execute the computer readable program to:
- when the T is not greater than the first predetermined value X, determine, from at least one of predefined transmission structures, a transmission structure with a symbol number corresponding to the T as the transmission structure of the PUCCH, wherein in at least one of the predefined transmission structures, different transmission structures correspond to different numbers of symbol;

or when the T is greater than the first predetermined value X, divide the T into A parts, wherein each of the A parts corresponds to an uplink control channel, the transmission length of each uplink control channel does not exceed the X, and each uplink control channel carries a same UCI information; and take i as 1 to A in sequence, determine a transmission length of the uplink control channel corresponding to the i-th part as $M_i$, and determine, from at least one of predefined transmission structures, a transmission structure with a symbol number corresponding to the $M_i$ as the transmission structure of the uplink control channel corresponding to the i-th part, wherein in at least one of the predefined transmission structures, different transmission structures correspond to different numbers of symbol.

22. The base station according to claim 21, wherein the processor is configured to read the memory to execute the computer readable program to:
determine that $$A = \left\lfloor \frac{T}{X} \right\rfloor + 1 \text{ or } \left\lceil \frac{T}{X} \right\rceil,$$

wherein a length of each of the A−1 parts in the A parts is X, and a length of one part in the A parts is T−(A−1)×X; or
determine that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lfloor \frac{T}{A} \right\rfloor,$$

and a length of one part in the A parts is $$T - \left\lfloor \frac{T}{A} \right\rfloor \times (A-1);$$

or
determine that $$A = \left\lfloor \frac{T}{X} \right\rfloor + 1 \text{ or } \left\lceil \frac{T}{X} \right\rceil,$$

wherein a length of each of the A−1 parts in the A parts is $$\left\lceil \frac{T}{A} \right\rceil,$$

and a length of one part in the A parts is $$T - \left\lceil \frac{T}{A} \right\rceil \times (A-1);$$

or take A as a second predetermined value, and determine a length of each of the A−1 parts in the A parts as $$\left\lfloor \frac{T}{A} \right\rfloor,$$

and a length of one part in the A parts as $$T - \left\lfloor \frac{T}{A} \right\rfloor \times (A-1),$$

wherein the second predetermined value is agreed beforehand or determined according to the slot structure or baseband parameters or a quantity of slots occupied by the PUCCH; or take A as a second predetermined value, and determine a length of each of the A−1 parts in the A parts as $$\left\lceil \frac{T}{A} \right\rceil,$$

and a length of one part in the A parts as $$T - \left\lceil \frac{T}{A} \right\rceil \times (A-1),$$

wherein the second predetermined value is agreed beforehand or determined according to the slot structure or baseband parameters or a quantity of slots occupied by the PUCCH.

\* \* \* \* \*